(12) United States Patent
Xu et al.

(10) Patent No.: US 9,788,290 B2
(45) Date of Patent: Oct. 10, 2017

(54) METHOD, DEVICE, AND SYSTEM FOR SENDING, RECEIVING, AND DETERMINING TIMING REFERENCE INFORMATION

(71) Applicant: Huawei Technologies Co., Ltd., Shenzhen, Guangdong (CN)

(72) Inventors: Wenying Xu, Shanghai (CN); Xueli Ma, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 466 days.

(21) Appl. No.: 14/487,525

(22) Filed: Sep. 16, 2014

(65) Prior Publication Data

US 2015/0009972 A1    Jan. 8, 2015

Related U.S. Application Data

(63) Continuation of application No. PCT/CN2013/072828, filed on Mar. 18, 2013.

(30) Foreign Application Priority Data

Mar. 16, 2012 (CN) .......................... 2012 1 0071448

(51) Int. Cl.
 *H04W 56/00* (2009.01)
 *H04L 1/18* (2006.01)
 *H04L 1/00* (2006.01)

(52) U.S. Cl.
 CPC ....... *H04W 56/0015* (2013.01); *H04L 1/1854* (2013.01); *H04L 1/1864* (2013.01); *H04L 2001/0093* (2013.01)

(58) Field of Classification Search
 None
 See application file for complete search history.

(56) References Cited

U.S. PATENT DOCUMENTS

2006/0285521 A1    12/2006    Steudle
2012/0069798 A1*   3/2012    Vitthaladevuni ......... H04L 1/02
                                                            370/328

(Continued)

FOREIGN PATENT DOCUMENTS

CN    101185359 A    5/2008
CN    102036364 A    4/2011

(Continued)

OTHER PUBLICATIONS

"HS-DPCCH Timing in Multiflow HSDPA," 3GPP TSG RAN WG1 Meeting #68, Dresden, Germany, R1-120600, 3$^{rd}$ Generation Partnership Project, Valbonne, France (Feb. 6-10, 2012).

(Continued)

*Primary Examiner* — Chirag Shah
*Assistant Examiner* — Srinivasa Reddivalam
(74) *Attorney, Agent, or Firm* — Leydig, Voit & Mayer, Ltd.

(57) ABSTRACT

Embodiments of the present invention disclose a method, a device, and a system for sending, receiving, and determining timing reference information, and pertain to the communications field. The method for sending timing reference information includes: acquiring access time difference information reported by a mobile terminal; generating timing reference information according to the access time difference information, where the timing reference information includes identifier information of a timing reference cell; and sending the timing reference information to the mobile terminal. By technical means of determining one of two cells with different downlink channel timings as a timing reference cell and using the timing reference cell as a benchmark to feed back HARQ-ACK information, the present invention solves a timing problem encountered when a UE uses a same (Continued)

HS-DPCCH to jointly feed back two pieces of HARQ-ACK information of a serving cell and an assisting serving cell.

18 Claims, 11 Drawing Sheets

(56) References Cited

U.S. PATENT DOCUMENTS

2014/0219143 A1* 8/2014 He ............... H04W 4/06
370/280
2014/0233535 A1 8/2014 Zhao et al.

FOREIGN PATENT DOCUMENTS

| CN | 102118801 A | 7/2011 |
|---|---|---|
| JP | 2009232112 A | 10/2009 |
| JP | 2013537781 A | 10/2013 |
| WO | WO 2012024331 A1 | 2/2012 |

OTHER PUBLICATIONS

"Further analysis of HS-DPCCH timing for MF-HSDPA," 3GPP TSG RAN WG1 Meeting #68, Dresden, Germany, R1-120683, $3^{rd}$ Generation Partnership Project, Valbonne, France (Feb. 6-10, 2012).

"$3^{rd}$ Generation Partnership Project; Technical Specification Group Radio Access Network; Physical channels and mapping of transport channels onto physical channels (FDD) (Release 11)," 3GPP TS 25.211, V11.0.0, Valbonne, France (Dec. 2011).

"$3^{rd}$ Generation Partnership Project; Technical Specification Group Radio Access Network; Radio Resource Control (RRC); Protocol specification (Release 11)," 3GPP TS 25.331, V11.0.0, Valbonne, France (Mar. 2012).

"Timing analysis of HS-DPCCH transmission for HSDPA MF-TX," 3GPP TSG RAN WGI Meeting #68, Dresden, Germany, R1-120792, Valbonne, France (Feb. 6-10, 2012).

"HS-DPCCH Feedback Design for MF-Tx," 3GPP TSG-RAN WG1 Meeting #68, Dresden, Germany, R1-120692, $3^{rd}$ Generation Partnership Project, Valbonne, France (Feb. 6-10, 2012).

\* cited by examiner

METHOD, DEVICE, AND SYSTEM FOR SENDING, RECEIVING, AND DETERMINING TIMING REFERENCE INFORMATION

CROSS-REFERENCE TO RELATED APPLICATIONS

This application is a continuation of International Patent Application No. PCT/CN2013/072828, filed on Mar. 18, 2013, which claims priority to Chinese Patent Application No. 201210071448.3, filed on Mar. 16, 2012, both of which are hereby incorporated by reference in their entireties.

TECHNICAL FIELD

The present invention relates to the field of communications technologies, and in particular, to a method, a device, and a system for sending, receiving, and determining timing reference information in a communications system including two cells with different downlink channel timings.

BACKGROUND

In a radio communications system, downlink transmission refers to a process in which a base station sends a signal to a user equipment. A downlink signal generally includes a data signal and a control signal. HSDPA (High Speed Downlink Packet Access) is a packet-based data service and may enhance a data transmission rate during downlink transmission. An HSDPA technology may be applied in a WCDMA (Wideband Code Division Multiple Access) system. In the WCDMA system, a base station is generally called a Node B (Base station) and a user equipment or a mobile terminal is generally called a UE (user equipment). Generally, an area covered by one NodeB is split into three or six sectors and each sector provides at least one cell.

To implement a function and a feature of HSDPA, HSDPA introduces three new channels in a physical layer specification: an HS-PDSCH (High-Speed Downlink Packet Access), an HS-SCCH (High-Speed Shared Control Channel), and an HS-DPCCH (Uplink High-Speed Dedicated Physical Control Channel). Simply speaking, on the one hand, a cell uses an HS-PDSCH channel to send a data signal in a downlink signal to a UE and uses an HS-SCCH channel to send a control signal in the downlink signal to the UE, where the control signal may be used to demodulate and decode the data signal and for other purposes; on the other hand, after receiving the data signal, the UE performs, according to the control signal, processing such as demodulation and decoding of a corresponding data signal and then uses an HS-DPCCH channel to feed back HARQ-ACK information (Hybrid Automatic Repeat Request-ACK) indicating a reception state to the cell, where the HARQ-ACK information may be ACK/NACK/DTX information, where, ACK indicates that the UE correctly receives the data signal, NACK indicates that the UE does not correctly receive the data signal, and DTX indicates that the UE does not detect data or that the cell is in an inactive state. One of key technologies used in this process, that is, HSDPA, is HARQ (Hybrid Automatic Repeat Request).

However, to further improve the data transmission rate during downlink transmission, it is further hoped that a multi-carrier/multi-cell technology and a multiflow transmission technology are introduced in the prior art. The multi-carrier/multi-cell technology introduces concepts of a serving cell and an assisting serving cell to enable one UE to simultaneously adopt two HSDPA provided by two or more cells (two cells are used as an example in this document) to collaboratively transmit downlink signals, which further improves the data transmission rate during downlink transmission. Meanwhile, the UE may use one HS-DPCCH channel provided by the serving cell to jointly feed back HARQ-ACK information to the serving cell and the assisting serving cell within one timeslot at the same time. The multiflow transmission technology may be considered as an extension of the multi-carrier/multi-cell technology. A greatest difference is that the multi-carrier/multi-cell technology requires the serving cell and the assisting serving cell to have same coverage and a same downlink channel timing relationship while the multiflow transmission technology does not require the serving cell and the assisting serving cell to have the same downlink channel timing relationship. The multiflow transmission technology is also called Multiflow Transmission, MF-Tx for short.

In a process of implementing the present invention, the inventors find that the prior art has at least the following problems: Because the multiflow transmission technology does not require the serving cell and the assisting serving cell to have the same downlink channel timing relationship whereas the UE needs to use a same HS-DPCCH to jointly encode two pieces of HARQ-ACK information of the serving cell and the assisting serving cell in a same timeslot to perform feedback, if it is hoped that the multiflow transmission technology is adopted, a timing problem will occur when the serving cell and the assisting serving cell have different downlink channel timings, for example, a case that the UE cannot determine how to feed back a corresponding message reception state occurs.

SUMMARY

To solve a problem that a UE cannot determine how to receive downlink data and feed back a corresponding message reception state when a serving cell and an assisting serving cell have different downlink channel timings, embodiments of the present invention provide a method, a device, and a system for sending, receiving, and determining timing reference information. Technical solutions are as follows:

According to a first aspect, a method for sending timing reference information is provided. The method is used in a communications system including two cells with different downlink channel timings, where the two cells both adopt a hybrid automatic repeat request process in high speed downlink packet access to perform downlink transmission. The method includes:

acquiring access time difference information reported by a mobile terminal;

generating timing reference information according to the access time difference information, where the timing reference information includes identifier information of a timing reference cell; and sending the timing reference information to the mobile terminal.

In a first possible implementation manner of the first aspect, the generating timing reference information according to the access time difference information specifically includes:

generating a subframe pairing relationship of the two cells according to the access time difference information;

determining, according to the access time difference information and the subframe pairing relationship, a time sequence relationship of two mutually paired subframes in the two cells;

determining an anterior cell and a posterior cell in the two cells;

determining, according to a scheduling period of a hybrid automatic repeat request process of the anterior cell, one of the anterior cell and the posterior cell as the timing reference cell and the other as a paired cell; and generating the timing reference information according to the identifier information of the timing reference cell.

With reference to the first possible implementation manner of the first aspect, in a second possible implementation manner, the determining an anterior cell and a posterior cell in the two cells specifically includes:

determining, according to the time sequence relationship of the two mutually paired subframes in the two cells, the anterior cell and the posterior cell in the two cells.

With reference to the first possible implementation manner of the first aspect, in a third possible implementation manner, the determining, according to a scheduling period of a hybrid automatic repeat request process of the anterior cell, one of the anterior cell and the posterior cell as the timing reference cell and the other as a paired cell specifically includes:

where the scheduling period of the hybrid automatic repeat request process of the anterior cell is one of a six-subframe duration, a seven-subframe duration, and an eight-subframe duration, determining, by a management node, if the hybrid automatic repeat request process scheduling period of the anterior cell is the six-subframe duration, the anterior cell as the timing reference cell and the posterior cell as the paired cell.

With reference to the first possible implementation manner of the first aspect, in a fourth possible implementation manner, the determining, according to a scheduling period of a hybrid automatic repeat request process of the anterior cell, one of the anterior cell and the posterior cell as the timing reference cell and the other as a paired cell specifically includes:

where the scheduling period of the hybrid automatic repeat request process of the anterior cell is one of a six-subframe duration, a seven-subframe duration, and an eight-subframe duration, determining, by a management node, if the scheduling period of the hybrid automatic repeat request process of the anterior cell is the seven-subframe duration or the eight-subframe duration, the posterior cell as the timing reference cell and the anterior cell as the paired cell.

With reference to any one of the first to fourth possible implementation manners of the first aspect, in a fifth possible implementation manner, the method for sending timing reference information further includes:

sending the subframe pairing relationship of the two cells to the mobile terminal.

With reference to any one of the first to fourth possible implementation manners of the first aspect, in a sixth possible implementation manner, the subframe pairing relationship includes:

system frame numbers and subframe numbers of the two mutually paired subframes in the two cells;

or in a first subframe and a second subframe that are mutually paired in the two cells, a system frame number and a subframe number of the first subframe, and a system frame number offset and a subframe number offset with the second subframe compared with the first subframe.

With reference to the first aspect or any one of the first to fourth possible implementation manners of the first aspect, in a seventh possible implementation manner, the method for sending timing reference information further includes:

sending feedback time indication information to the mobile terminal, where the feedback time indication information is used to indicate a predefined timeslot length, where a value range of the predefined timeslot length is [7.5 timeslots−1.5 timeslots, 7.5 timeslots+1.5 timeslots].

According to a second aspect, a method for receiving timing reference information is provided. The method is used in a communications system including two cells with different downlink channel timings, where the two cells both adopt a hybrid automatic repeat request process in high speed downlink packet access to perform downlink transmission. The method includes:

receiving timing reference information sent by a management node;

learning, according to the timing reference information, that one of the two cells is a timing reference cell; and receiving paired subframes of the two cells and feeding back, after a subframe in the timing reference cell is received, hybrid automatic repeat request acknowledgement information after a predefined timeslot length, where the hybrid automatic repeat request acknowledgement information is hybrid automatic repeat request acknowledgement information jointly fed back for the paired subframes in the two cells at the same time.

In a first possible implementation manner of the second aspect, before the receiving paired subframes of the two cells, the method further includes:

receiving a subframe pairing relationship of the two cells that is sent by the management node; and correspondingly, before the receiving paired subframes of the two cells, the method specifically includes:

receiving, according to the received subframe pairing relationship of the two cells, the paired subframes of the two cells.

With reference to the second aspect or the first possible implementation manner of the second aspect, in a second possible implementation manner, the method for receiving timing reference information further includes:

receiving and parsing feedback time indication information sent by the management node to acquire the predefined timeslot length, where a value range of the predefined timeslot length is [7.5 timeslots−1.5 timeslots, 7.5 timeslots+1.5 timeslots].

According to a third aspect, a method for determining timing reference information is provided. The method is used in a communications system including two cells with different downlink channel timings, where the two cells both adopt a hybrid automatic repeat request process in high speed downlink packet access to perform downlink transmission. The method includes:

determining, according to a time sequence relationship of two mutually paired subframes in the two cells, an anterior cell and a posterior cell in the two cells; and determining, according to a scheduling period of a hybrid automatic repeat request process of the anterior cell, one of the anterior cell and the posterior cell as a timing reference cell and the other as a paired cell.

In a first possible implementation manner of the third aspect, the determining, according to a scheduling period of a hybrid automatic repeat request process of the anterior cell, one of the anterior cell and the posterior cell as a timing reference cell and the other as a paired cell specifically includes:

where the scheduling period of the hybrid automatic repeat request process of the anterior cell is one of a six-subframe duration, a seven-subframe duration, and an eight-subframe duration, determining, if the scheduling period of the hybrid automatic repeat request process of the anterior cell is the six-subframe duration, the anterior cell as the timing reference cell and the posterior cell as the paired cell.

In a second possible implementation manner of the third aspect, the determining, according to a scheduling period of a hybrid automatic repeat request process of the anterior cell, one of the anterior cell and the posterior cell as a timing reference cell and the other as a paired cell specifically includes:

where the scheduling period of the hybrid automatic repeat request process of the anterior cell is one of a six-subframe duration, a seven-subframe duration, and an eight-subframe duration, determining, if the scheduling period of the hybrid automatic repeat request process of the anterior cell is the seven-subframe duration or the eight-subframe duration, the posterior cell as the timing reference cell and the anterior cell as the paired cell.

According to a fourth aspect, a radio network controller is provided. The radio network controller is used in a communications system including two cells with different downlink channel timings, where the two cells both adopt a hybrid automatic repeat request process in high speed downlink packet access to perform downlink transmission. The radio network controller includes:

an access time acquiring module, configured to acquire access time difference information reported by a mobile terminal;

a timing reference determining module, configured to generate timing reference information according to the access time difference information, where the timing reference information includes identifier information of a timing reference cell; and a timing reference sending module, configured to send the timing reference information to the mobile terminal.

In a first possible implementation manner of the fourth aspect, the timing reference determining module specifically includes:

a pairing relationship generating unit, a time relationship determining unit, a cell relationship determining unit, a timing reference determining unit, and a reference information generating unit, where:

the pairing relationship generating unit is configured to generate a subframe pairing relationship of the two cells according to the access time difference information;

the time relationship determining unit is configured to determine, according to the access time difference information and the subframe pairing relationship, a time sequence relationship of two mutually paired subframes in the two cells;

the cell relationship determining unit is configured to determine an anterior cell and a posterior cell in the two cells;

the timing reference determining unit is configured to determine, according to a scheduling period of a hybrid automatic repeat request process of the anterior cell, one of the anterior cell and the posterior cell as the timing reference cell and the other as a paired cell; and the reference information generating unit is configured to generate the timing reference information according to the identifier information of the timing reference cell.

With reference to the first possible implementation manner of the fourth aspect, in a second possible implementation manner, the cell relationship determining unit is specifically configured to determine, according to the time sequence relationship of the two mutually paired subframes in the two cells, the anterior cell and the posterior cell in the two cells.

With reference to the first possible implementation manner of the fourth aspect, in a third possible implementation manner, the timing reference determining unit specifically includes:

a first determining subunit, where:

the scheduling period of the hybrid automatic repeat request process of the anterior cell is one of a six-subframe duration, a seven-subframe duration, and an eight-subframe duration; and the first determining subunit is configured to determine, if the scheduling period of the hybrid automatic repeat request process of the anterior cell is the six-subframe duration, the anterior cell as the timing reference cell and the posterior cell as the paired cell.

With reference to the first possible implementation manner of the fourth aspect, in a fourth possible implementation manner, the timing reference determining unit specifically includes:

a second determining subunit, where:

the scheduling period of the hybrid automatic repeat request process of the anterior cell is one of a six-subframe duration, a seven-subframe duration, and an eight-subframe duration; and the second determining subunit is configured to determine, if the scheduling period of the hybrid automatic repeat request process of the anterior cell is the seven-subframe duration or the eight-subframe duration, the posterior cell as the timing reference cell and the anterior cell as the paired cell.

With reference to any one of the first to fourth possible implementation manners of the fourth aspect, in a fifth possible implementation manner, the radio network controller further includes:

a pairing relationship sending module, configured to send the subframe pairing relationship of the two cells to the mobile terminal.

With reference to any one of the first to fourth possible implementation manners of the fourth aspect, in a sixth possible implementation manner, the radio network controller further includes:

an indication information sending module, configured to send feedback time indication information to the mobile terminal, where the feedback time indication information is used to indicate a predefined timeslot length, where a value range of the predefined timeslot length is [7.5 timeslots−1.5 timeslots, 7.5 timeslots+1.5 timeslots].

With reference to any one of the first to fourth possible implementation manners of the fourth aspect, in a seventh possible implementation manner, the subframe pairing relationship generated by the pairing relationship generating unit includes:

system frame numbers and subframe numbers of the two mutually paired subframes in the two cells;

or in a first subframe and a second subframe that are mutually paired in the two cells, a system frame number and a subframe number of the first subframe, and a system frame number offset and a subframe number offset with the second subframe compared with the first subframe.

According to a fifth aspect, a mobile terminal is provided. The mobile terminal is used in a communications system including two cells with different downlink channel timings, where the two cells both adopt a hybrid automatic repeat request process in high speed downlink packet access to perform downlink transmission. The mobile terminal includes:

a reference information receiving module, configured to receive timing reference information;

a reference information parsing module, configured to learn, according to the timing reference information, that one of the two cells is a timing reference cell;

a paired subframe receiving module, configured to receive paired subframes of the two cells; and a reception information feeding back module, configured to feed back, after a subframe in the timing reference cell is received, hybrid automatic repeat request acknowledgement information after a predefined timeslot length, where the hybrid automatic repeat request acknowledgement information is hybrid automatic repeat request acknowledgement information jointly fed back for the paired subframes in the two cells at the same time.

In a first possible implementation manner of the fifth aspect, the mobile terminal further includes:

a pairing relationship receiving module, configured to receive a subframe pairing relationship of the two cells; and correspondingly, the paired subframe receiving module is specifically configured to receive, according to the subframe pairing relationship of the two cells that is received by the pairing relationship receiving module, the paired subframes of the two cells.

With reference to the fifth aspect or the first possible implementation manner of the fifth aspect, in a second possible implementation manner, the mobile terminal further includes:

an indication information parsing module, configured to receive and parse feedback time indication information to acquire the predefined timeslot length, where a value range of the predefined timeslot length is [7.5 timeslots−1.5 timeslots, 7.5 timeslots+1.5 timeslots].

According to a sixth aspect, a mobile terminal is provided. The mobile terminal is used in a communications system including two cells with different downlink channel timings, where the two cells both adopt a hybrid automatic repeat request process in high speed downlink packet access to perform downlink transmission. The mobile terminal includes:

a cell relationship determining module, configured to determine an anterior cell and a posterior cell in the two cells;

a timing reference determining module, configured to determine, according to a scheduling period of a hybrid automatic repeat request process of the anterior cell, one of the anterior cell and the posterior cell as a timing reference cell and the other as a paired cell; and a reception information feeding back module, configured to feed back, after a subframe in the timing reference cell is received, hybrid automatic repeat request acknowledgement information after a predefined timeslot length, where the hybrid automatic repeat request acknowledgement information is hybrid automatic repeat request acknowledgement information jointly fed back for two mutually paired subframes in the two cells at the same time.

In a first possible implementation manner of the sixth aspect, the cell relationship determining module is specifically configured to determine, according to a time sequence relationship of the two mutually paired subframes in the two cells, the anterior cell and the posterior cell in the two cells.

In a second possible implementation manner of the sixth aspect, the timing reference determining module specifically includes:

a first determining unit, where the scheduling period of the hybrid automatic repeat request process of the anterior cell is one of a six-subframe duration, a seven-subframe duration, and an eight-subframe duration; and the first determining unit is configured to determine, if the scheduling period of the hybrid automatic repeat request process of the anterior cell is the six-subframe duration, the anterior cell as the timing reference cell and the posterior cell as the paired cell.

In a third possible implementation manner of the sixth aspect, the timing reference determining module specifically includes:

a second determining unit, where the scheduling period of the hybrid automatic repeat request process of the anterior cell is one of a six-subframe duration, a seven-subframe duration, and an eight-subframe duration; and the second determining unit is configured to determine, if the scheduling period of the hybrid automatic repeat request process of the anterior cell is the seven-subframe duration or the eight-subframe duration, the posterior cell as the timing reference cell and the anterior cell as the paired cell.

With reference to the sixth aspect or any one of the first to third possible implementation manners of the sixth aspect, in a fourth possible implementation manner, the mobile terminal further includes:

an access information acquiring module and a first time relationship determining module, where:

the access information acquiring module is configured to acquire access time difference information of the two cells; and the first time relationship determining module is configured to determine, according to the access time difference information, the time sequence relationship of the two mutually paired subframes in the two cells.

With reference to the sixth aspect or any one of the first to third possible implementation manners of the sixth aspect, in a fifth possible implementation manner, the mobile terminal further includes:

a pairing relationship receiving module, a reception time acquiring module, and a second time relationship determining module, where:

the pairing relationship receiving module is configured to receive a subframe pairing relationship of the two cells;

the reception time acquiring module is configured to acquire reception time of the two mutually paired subframes in the two cells; and the second time relationship determining module is configured to determine, according to the subframe pairing relationship and the reception time, the time sequence relationship of the two mutually paired subframes in the two cells.

With reference to the fifth possible implementation manner of the sixth aspect, in a sixth possible implementation manner, the subframe pairing relationship further includes:

system frame numbers and subframe numbers of the two mutually paired subframes in the two cells;

or in a first subframe and a second subframe that are mutually paired in the two cells, a system frame number and a subframe number of the first subframe, and a system frame number offset and a subframe number offset with the second subframe compared with the first subframe.

According to a seventh aspect, a communications system is provided. The system includes the radio network controller according to the fourth aspect or any one of all possible implementation manners of the fourth aspect and the mobile terminal according to the fifth aspect or any one of all possible implementation manners of the fifth aspect.

The technical solutions provided by embodiments of the present invention bring the following beneficial effects:

By technical means of determining one of two cells with different downlink channel timings as a timing reference cell and using the timing reference cell as a benchmark to feed back HARQ-ACK information, a timing problem encountered when a UE uses a same HS-DPCCH to jointly feed back two pieces of HARQ-ACK information of a serving cell and an assisting serving cell is solved. With reference to technical means of shortening or extending processing time at a UE side and a Node B side, a technical effect of enabling the UE to use a multiflow transmission technology in the two cells with different downlink channel timings is achieved.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention more comprehensible, the following describes the implementation manners of the present invention in detail with reference to the accompanying drawings.

Figure 1:
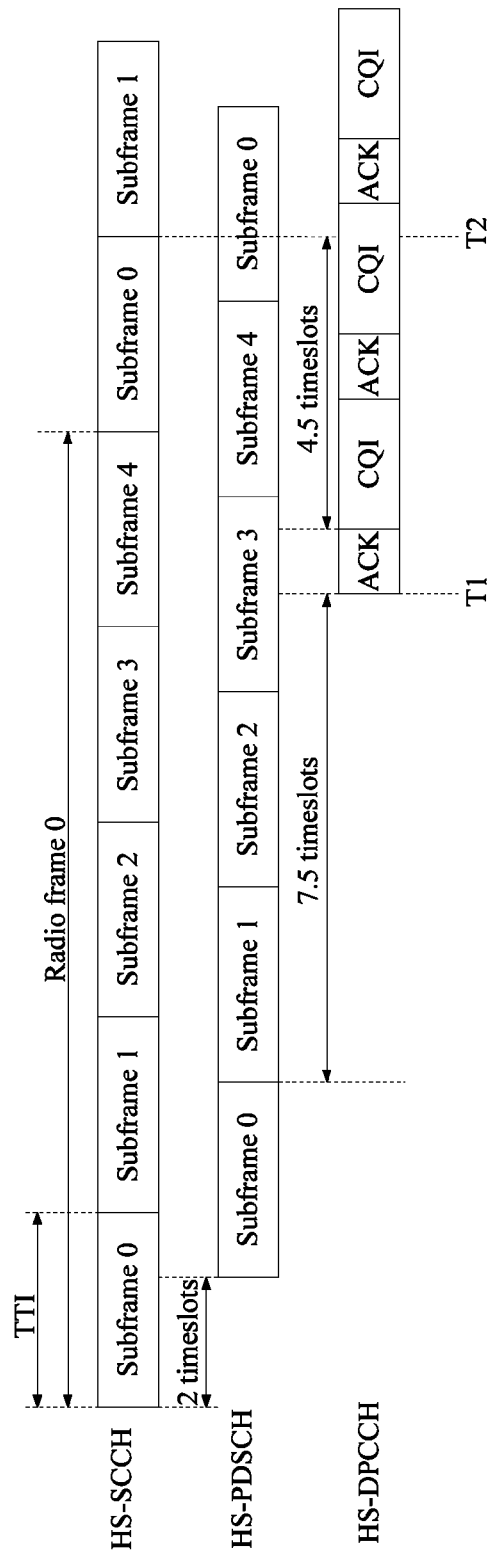
FIG. 1 is a timing relationship diagram of three types of channels introduced by HSDPA in an HARQ process scheduling process.

For ease of description, reference is first made to FIG. 1, which is a timing relationship diagram of three types of channels introduced by an HSDPA technology in an HARQ process scheduling process. It should be first understood that: in FIG. 1, 2560 chips form one timeslot, three timeslots form one subframe, five subframes form one radio frame, a time interval of one subframe is one transmission time interval (Transmission Time Interval, TTI for short), and one cell transmits one or two data blocks (two data blocks are transmitted in a case of multi-input multi-output dual-flow transmission) for a UE at one transmission time interval. When a base station needs to transmit a downlink signal to the UE, the downlink signal may be divided into multiple data blocks. It is assumed that what is shown in FIG. 1 is a situation in which one of the multiple data blocks is transmitted. A first subframe in an HS-SCCH channel is a control signal that includes relevant signaling for demodulation and decoding of the data block, and the like. A first subframe in an HS-DPCCH channel includes an actual data signal of the data block. To enable the UE to first acquire the control signal so as to process the data signal, a relevant protocol specifies that a subframe in an HS-SCCH channel should be sent two timeslots earlier than a corresponding subframe in an HS-PDSCH channel. In this way, the UE may first acquire the control signal and then perform, when acquiring the data signal, corresponding demodulation and decoding and other operations according to the received control signal. It takes some time for the UE to complete an entire process for processing the data signal. For this reason, the UE generally uses the HS-DPCCH channel to feed back HARQ-ACK information and CQI information to the Node B about 7.5 timeslots (time T1 in FIG. 1) after the first subframe in the HS-PDSCH channel is received, where the HARQ-ACK information occupies one timeslot length and the CQI (Channel Quality Indicator, channel quality indicator) information occupies two timeslot lengths. Then, the cell starts to schedule, according to the information fed back from the UE, transmission of a next data block. Specifically, an entire HARQ process scheduling period is generally a length of six subframes, that is, the cell generally sends, after sending a data block of a process, a next data block of the process after a time corresponding to the six subframes. Therefore, it may be calculated that, after receiving the HARQ-ACK information, the Node B needs to be ready to send the next data block within (timeslots occupied by the scheduling period−timeslot advance of the control signal−timeslots occupied by the data signal−UE processing time−timeslots occupied by the ACK information)=6 subframes×3 timeslots−2 timeslots−1 subframe×3 timeslots−7.5 timeslots−1 timeslot=4.5 timeslots, that is, the Node B starts to send the next data block at time T2 in FIG. 1.

Figure 2A:
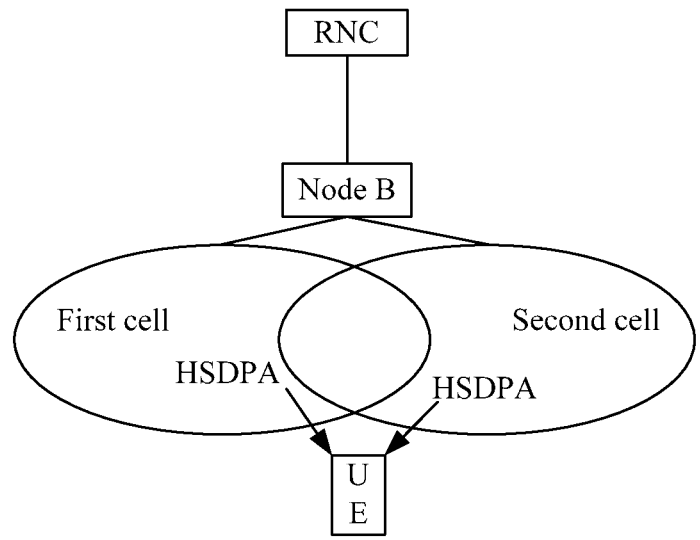
FIG. 2A is a partial schematic structural diagram of a multi-cell communications system.

Reference is further made to FIG. 2A, which is a partial schematic structural diagram of a multi-cell communications system. The communications system includes an RNC (Radio Network Controller), a Node B, and a first cell and a second cell controlled by the Node B. The first cell may be a serving cell and the second cell may be an assisting serving cell. Working frequencies/carriers of the first cell and the second cell may be the same or may be different. A UE may simultaneously use two HSDPA provided by the first cell and the second cell to collaboratively transmit data, so as to improve a transmission rate during downlink transmission.

Figure 2B:
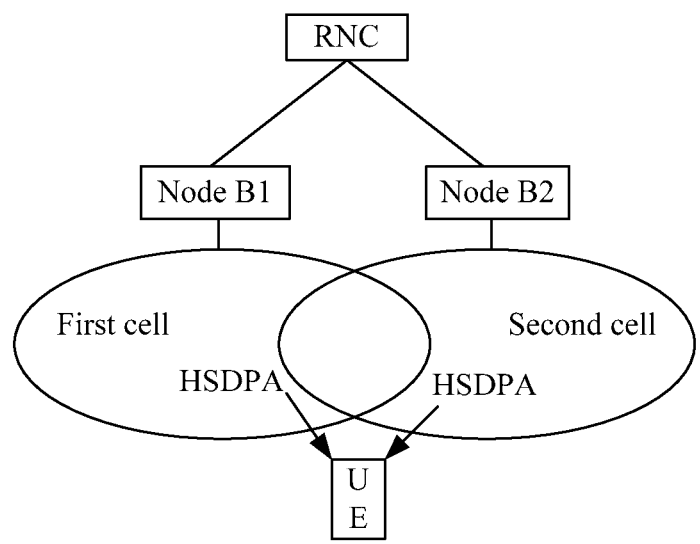
FIG. 2B is a partial schematic structural diagram of another multi-cell communications system.

Reference is further made to FIG. 2B, which is a partial schematic structural diagram of a multi-cell communications system. The communications system includes an RNC, a first base station Node B1 and a second base station Node B2 controlled by the RNC, and further includes a first cell controlled by the Node B1, and a second cell controlled by the Node B2. The first cell may be a serving cell and the second cell may be an assisting serving cell. Working frequencies/carriers of the first cell and the second cell may be the same or may be different. A UE may simultaneously use two HSDPA provided by the first cell and the second cell to collaboratively transmit data, so as to improve a transmission rate during downlink transmission.

The serving cell and the assisting serving cell may also be called a primary serving cell/an assisting serving cell, a primary cell/a secondary cell, or an assisted cell/an assisting cell in different embodiments. In a multi-carrier/multi-cell technology, the serving cell carries an HS-SCCH channel, an HS-PDSCH channel, an HS-DPCCH channel, a CPICH channel (Common Pilot Channel) channel, and other dedicated channels, while the assisting cell carries only an HS-SCCH channel, an HS-PDSCH used for HSDPA data transmission, and a CPICH channel used for channel estimation and measurement, and the like. When the UE uses the two HS-PDSCH channels of the serving cell and the assisting serving cell to collaboratively transmit a data signal, one HS-DPCCH channel in the serving cell is used to feed back a reception state. When the serving cell and the assisting serving cell have a same downlink channel timing, the UE only needs to jointly encode HARQ-ACK information of paired subframes in the serving cell and the assisting serving cell within a same timeslot and then use the HS-DPCCH channel in the serving cell to feed back the HARQ-ACK information. The serving cell and the assisting serving cell may parse a same HARQ-ACK information in the HS-DPCCH channel in the serving cell at the same time to acquire their own required feedback information. If a multiflow transmission technology is used, that is, if the serving cell and the assisting serving cell have different downlink channel timings, the timing method and the timing feedback method provided by the embodiments of the present invention may be used to solve a timing problem caused by different downlink channel timings.

Embodiment 1

Figure 3:
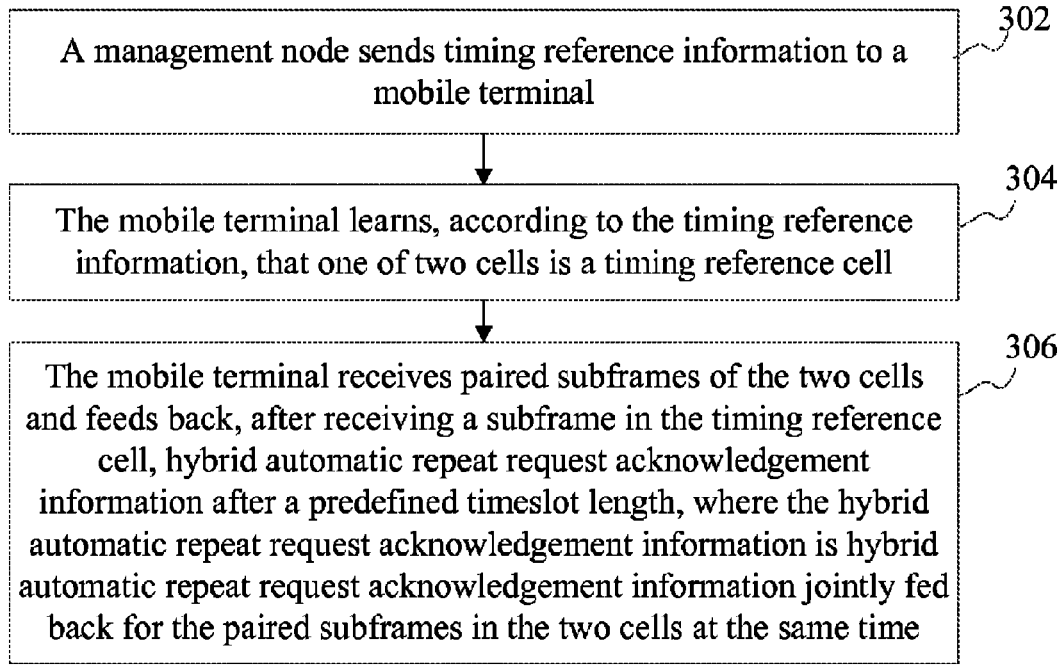
FIG. 3 is a flowchart of a timing method according to Embodiment 1 of the present invention.

Reference is made to FIG. 3, which is a flowchart of a timing method provided by Embodiment 1 of the present invention. The timing method may be used in a communications system shown in FIG. 2A or FIG. 2B. The communications system may include two cells with different downlink channel timings, where the two cells both adopt high speed downlink packet access to perform downlink transmission. Certainly, a person skilled in the art may easily think that the timing method may also be used in dual-carrier dual-cell and dual-carrier four-cell scenarios. The timing method may include:

Step 302: A management node sends timing reference information to a mobile terminal.

The management node may be an RNC. Before downlink data is sent, the management node may send the timing reference information to the UE. The timing reference information generally includes identifier information of one cell that serves as a timing reference cell of the foregoing two cells, where the identifier information may be a cell sequence number and the cell sequence number is a non-negative integer.

Step 304: The mobile terminal learns, according to the timing reference information, that one of the two cells is the timing reference cell.

The UE may learn, according to the received timing reference information, that one of the two cell is the timing reference cell and that the other is a paired cell. For example, if the identifier information in the timing reference information is a sequence number of a serving cell, the UE may know that the serving cell is the timing reference cell and that an assisting serving cell is a paired cell.

Step 306: The mobile terminal receives paired subframes of the two cells and feeds back, after receiving a subframe in the timing reference cell, hybrid automatic repeat request acknowledgement information after a predefined timeslot length, where the hybrid automatic repeat request acknowledgement information is hybrid automatic repeat request acknowledgement information jointly fed back for the paired subframes in the two cells at the same time.

The UE may receive the paired subframes sent by the two cells through a downlink channel, that is, a downlink signal. When the UE simultaneously uses two HS-PDSCH channels of the serving cell and the assisting serving cell to collaboratively transmit the downlink signal, one subframe transmitted in the HS-PDSCH channel of the serving cell and another subframe transmitted in the HS-PDSCH of the assisting serving cell are mutually paired subframes. If the serving cell and the assisting serving cell have a same downlink timing, the two subframes should be sent to a UE side at the same time. If the serving cell and the assisting serving cell have different downlink timings, the two subframes generally are not sent to the UE side at the same time, that is, one subframe is first sent to the UE side while after a delay, the other paired subframe is sent to the UE side. The UE needs to feed back, after receiving the subframe in the timing reference cell, the HARQ-ACK information after the predefined timeslot length, where the HARQ-ACK information is HARQ-ACK information jointly fed back for the paired subframes in the two cells at the same time.

To sum up, by technical means of determining one of two cells with different downlink channel timings as a timing reference cell and using the timing reference cell as a benchmark to feed back HARQ-ACK information, the timing method provided by Embodiment 1 solves a timing problem encountered when a UE uses a same HS-DPCCH to jointly feed back two pieces of HARQ-ACK information of a serving cell and an assisting serving cell. With reference to technical means of shortening or extending processing time at a UE side and a Node B side, a technical effect of enabling the UE to use a multiflow transmission technology in the two cells with different downlink channel timings is achieved.

Embodiment 2

Figure 4:
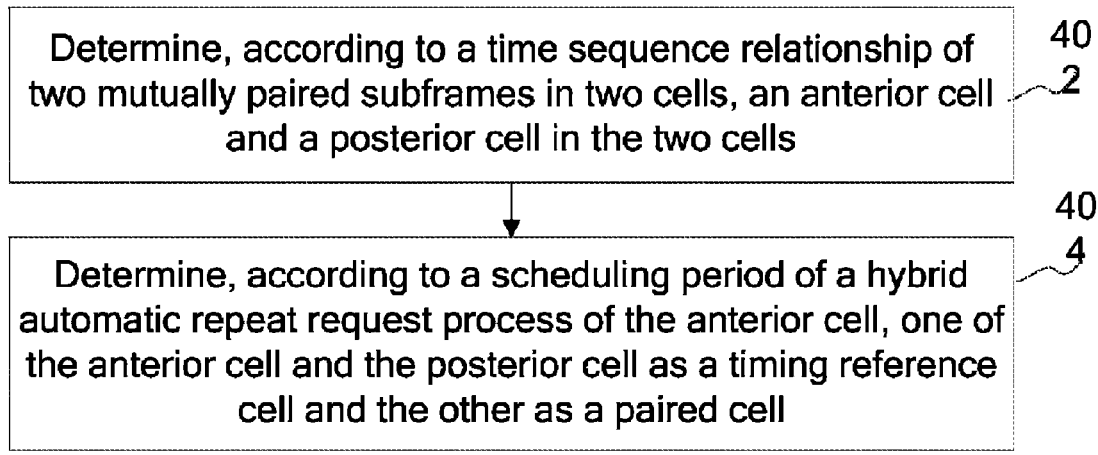
FIG. 4 is a flowchart of a timing reference determining method according to Embodiment 2 of the present invention.

To determine one of two cells as a timing reference cell, reference is made to FIG. 4, which illustrates a timing reference determining method provided by Embodiment 2 of the present invention. The timing reference determining method may be used in a communications system shown in FIG. 2A or FIG. 2B. The communications system may include two cells with different downlink channel timings, where the two cells both adopt high speed downlink packet access to perform downlink transmission. Certainly, a person skilled in the art may easily think that the timing reference determining method may also be used in dual-carrier dual-cell and dual-carrier four-cell scenarios. The timing reference determining method may include:

Step 402: Determine, according to a time sequence relationship of two mutually paired subframes in the two cells, an anterior cell and a posterior cell in the two cells.

When a UE simultaneously uses two HS-PDSCH channels of a serving cell and an assisting serving cell to collaboratively transmit a data signal, one subframe transmitted in the HS-PDSCH channel of the serving cell and another subframe transmitted in the HS-PDSCH of the assisting serving cell are mutually paired subframes. According to the time sequence relationship of the two subframes, a cell in which an earlier subframe resides is defined as the anterior cell while a cell in which a later subframe resides is defined as the posterior cell.

Step 404: Determine, according to a scheduling period of a hybrid automatic repeat request process of the anterior cell, one of the anterior cell and the posterior cell as the timing reference cell and the other as a paired cell.

A scheduling period of a HARQ process may be understood as a duration from when a cell starts to transmit a subframe of a data signal of a process in an HS-PDSCH channel to when the cell continues to transmit a next subframe of the data signal of the process. Generally speaking, the scheduling period of the HARQ process may be any one of a six-subframe duration, a seven-subframe duration, and an eight-subframe duration. A scheduling period of a HARQ process used by each cell is generally fixed (unless an RNC performs reconfiguration). Scheduling periods of HARQ processes adopted by the anterior cell and the posterior cell may be different. According to a scheduling period of a HARQ process of the anterior cell, one of the anterior cell and the posterior cell may be defined as the timing reference cell and the other as the paired cell. During determination, selection may be made according to a predefined policy. The predefined policy may be as follows: if the scheduling period of the HARQ process of the anterior cell is the six-subframe duration, the anterior cell is determined as the timing reference cell and the posterior cell as the paired cell; if the scheduling period of the HARQ process of the anterior cell is the seven-subframe duration or the eight-subframe duration, the posterior cell is determined as the timing reference cell and the anterior cell as the paired cell. The predefined policy mainly aims to ensure, when processing time at a UE side and a Node B side is shortened, that the UE side and the Node B side have enough processing time to complete their work.

To sum up, the timing reference determining method provided by Embodiment 2 may properly determine one of two cells as a timing reference cell. In addition, after the timing reference cell is determined by using the timing reference determining method, it may be ensured, when processing time at a UE side and a Node B side is shortened, that the UE side and the Node B side can have enough processing time to complete their own work.

It should be noted that the timing reference determining method may be implemented by a management node such as an RNC, and may also be implemented by a UE itself. Generally, the timing reference determining method is implemented by the management node. To describe all aspects of the present invention, the following describes different embodiments in detail with reference to different implementation environments.

Embodiment 3

It is assumed that a specific implementation scenario in this embodiment is as follows: scheduling periods of HARQ processes of two cells both are a six-subframe duration and a delay between paired subframes is 1.5 timeslots. A process of determining a timing reference cell is implemented by a management node.

Figure 5A:
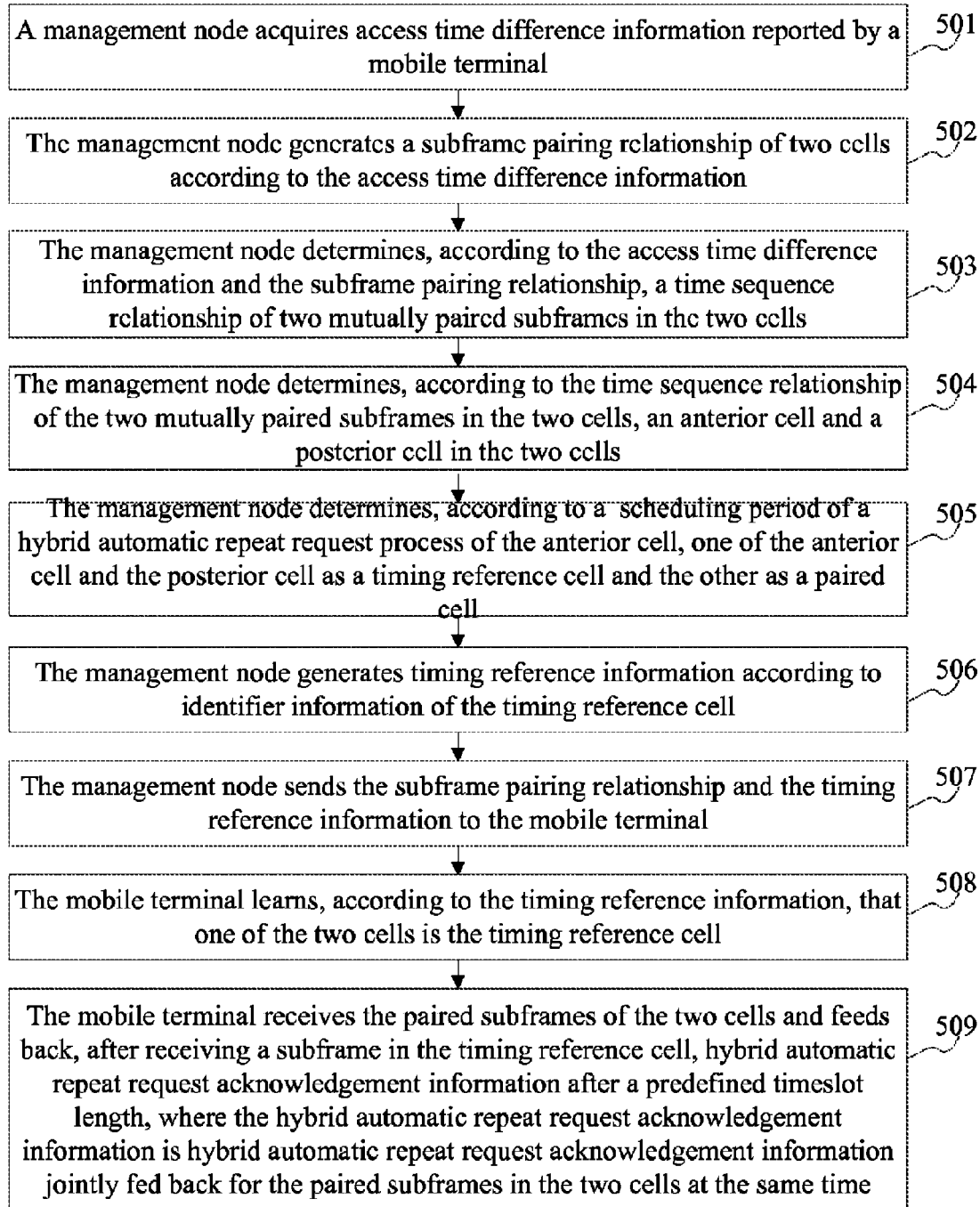
FIG. 5A is a flowchart of a timing method according to Embodiment 3 of the present invention.

Reference is made to FIG. 5A, which is a flowchart of a timing method provided by Embodiment 3 of the present invention. The timing method may be used in a communications system shown in FIG. 2A or FIG. 2B. The communications system may include two cells with different downlink channel timings, where the two cells both adopt high speed downlink packet access perform downlink transmission. Certainly, a person skilled in the art may easily think that the timing method may also be used in dual-carrier dual-cell and dual-carrier four-cell scenarios. The timing method may include:

Step 501: A management node acquires access time difference information reported by a mobile terminal.

The access time difference information, that is, an SFN-SFN observed time difference, is acquired according to SFN information of a P-CCPCH (Primary Common Control Physical Channel). The UE may observe the access time difference and report it to an RNC. A specific value of the access time difference is generally represented by using a chip-level unit and a timing difference of the two cells may be represented.

Step 502: The management node generates a subframe pairing relationship of the two cells according to the access time difference information.

The RNC may generate, according to the access time difference information reported by the UE, the subframe pairing relationship of the two cells. Because the two cells need to be used to collaboratively send a downlink signal, subframes that the two cells separately send to the UE are mutually paired. Specifically, specific content of the subframe pairing relationship in this document may be in either of the following forms: first, system frame numbers and subframe numbers of the two mutually subframes in the two cells; and second, in a first subframe and a second subframe that are mutually paired in the two cells, a system frame number and a subframe number of the first subframe, and a system frame number offset and a subframe number offset with the second subframe compared with the first subframe. The system frame number offset and the subframe number offset herein both are integers. The two mutually paired subframes may be two mutually paired subframes in an HS-SCCH channel, and may also be two mutually paired subframes in an HS-PDSCH channel.

Step 503: The management node determines, according to the access time difference information and the subframe pairing relationship, a time sequence relationship of the two mutually paired subframes in the two cells.

After determining the subframe pairing relationship, the RNC may determine, according to the access time difference information and the subframe pairing relationship, the time sequence relationship of the two mutually paired subframes in the two cells. For example, the time sequence relationship of the two mutually paired subframes is that one subframe is 1.5 timeslots earlier than the other. For ease of description, reference is made to FIG. 5B, which shows a timing relationship between various channels in the embodiment. It is assumed that an HS-SCCH1 channel and an HS-PDSCH1 channel belong to one cell while an HS-SCCH2 channel and an HS-PDSCH2 channel belong to another cell. An HS-DPCCH channel is an uplink feedback channel carried by a serving cell in the two cells. It may be known from the foregoing description that a first subframe 512 in the HS-SCCH1 channel is used to carry a control signal for decoding a first subframe 514 in the HS-PDSCH1 channel and therefore needs to be sent two timeslots in advance. In the same way, a first subframe 522 in the HS-SCCH2 channel is used to carry a control signal for decoding a first subframe 524 in the HS-PDSCH2 channel and therefore also needs to be sent two timeslots in advance. After determining the subframe pairing relationship, the RNC determines the first subframe 512 in the HS-SCCH1 channel and the first subframe 522 in the HS-SCCH2 channel as mutually paired subframes, and then may know, according to the access time difference information, that the first subframe 512 in the HS-SCCH1 channel is 1.5 timeslots earlier than the first subframe 522 in the HS-SCCH2 channel. Therefore, the RNC may determine that the first subframe 512 in the HS-SCCH1 channel is an anterior subframe and that the first subframe 522 in the HS-SCCH2 channel is a posterior subframe.

Step 504: The management node determines, according to the time sequence relationship of the two mutually paired subframes in the two cells, an anterior cell and a posterior cell in the two cells.

After the RNC determines the first subframe 512 in the HS-SCCH1 channel as the anterior subframe and the first subframe 522 in the HS-SCCH2 channel as the posterior subframe, the RNC may determine a cell to which the HS-SCCH1 channel belongs as the anterior cell and a cell to which the HS-SCCH2 channel belongs as the posterior cell.

Step 505: The management node determines, according to a scheduling period of a hybrid automatic repeat request process of the anterior cell, one of the anterior cell and the posterior cell as a timing reference cell and the other as a paired cell.

The RNC may acquire scheduling periods of HARQ processes of the anterior cell and the posterior cell. In this embodiment, the RNC may acquire that a scheduling period of a HARQ process of the anterior cell is the six-subframe duration. Therefore, the RNC may determine, according to the timing reference determining method provided by Embodiment 2, the anterior cell as the timing reference cell and the posterior cell as the paired cell.

Step 506: The management node generates timing reference information according to identifier information of the timing reference cell.

The timing reference information generally includes the identifier information of one cell that serves as the timing reference cell of the foregoing two cells, where the identifier information may be a cell sequence number and the cell sequence number is a non-negative integer.

Step 507: The management node sends the subframe pairing relationship and the timing reference information to the mobile terminal.

The RNC may send the subframe pairing relationship and the timing reference information to the mobile terminal at the same time or at different time so that the mobile terminal receives the subframes. Preferably, the RNC may further send, while sending the timing reference information, feedback time indication information to the mobile terminal, where the feedback time indication information is used to indicate a predefined timeslot length. A value range of the predefined timeslot length is [7.5 timeslots−1.5 timeslots, 7.5 timeslots+1.5 timeslots].

Step 508: The mobile terminal recognizes, according to the timing reference information, that one of the two cells is the timing reference cell.

The UE may learn, after receiving the timing reference information, that the cell to which HS-SCCH1 channel belongs is the timing reference cell and that the cell to which the HS-SCCH2 channel belongs is the paired cell.

Step 509: The mobile terminal receives the paired subframes of the two cells and feeds back, after receiving a subframe in the timing reference cell, hybrid automatic repeat request acknowledgement information after the predefined timeslot length, where the hybrid automatic repeat request acknowledgement information is hybrid automatic repeat request acknowledgement information jointly fed back for the paired subframes in the two cells at the same time.

The UE may receive, according to the subframe pairing relationship of the two cells that is sent by the RNC, the paired subframes of the two cells. Specifically speaking, the UE needs to feed back, after receiving the subframe in the timing reference cell and a paired subframe in the other cell, HARQ-ACK information after the predefined timeslot length, where the HARQ-ACK information is the HARQ-ACK information jointly fed back for the two mutually paired subframes in the two cells. The predefined timeslot length may be a default value, and may also be a value acquired by parsing the feedback time indication information sent by the RNC.

Figure 5B:
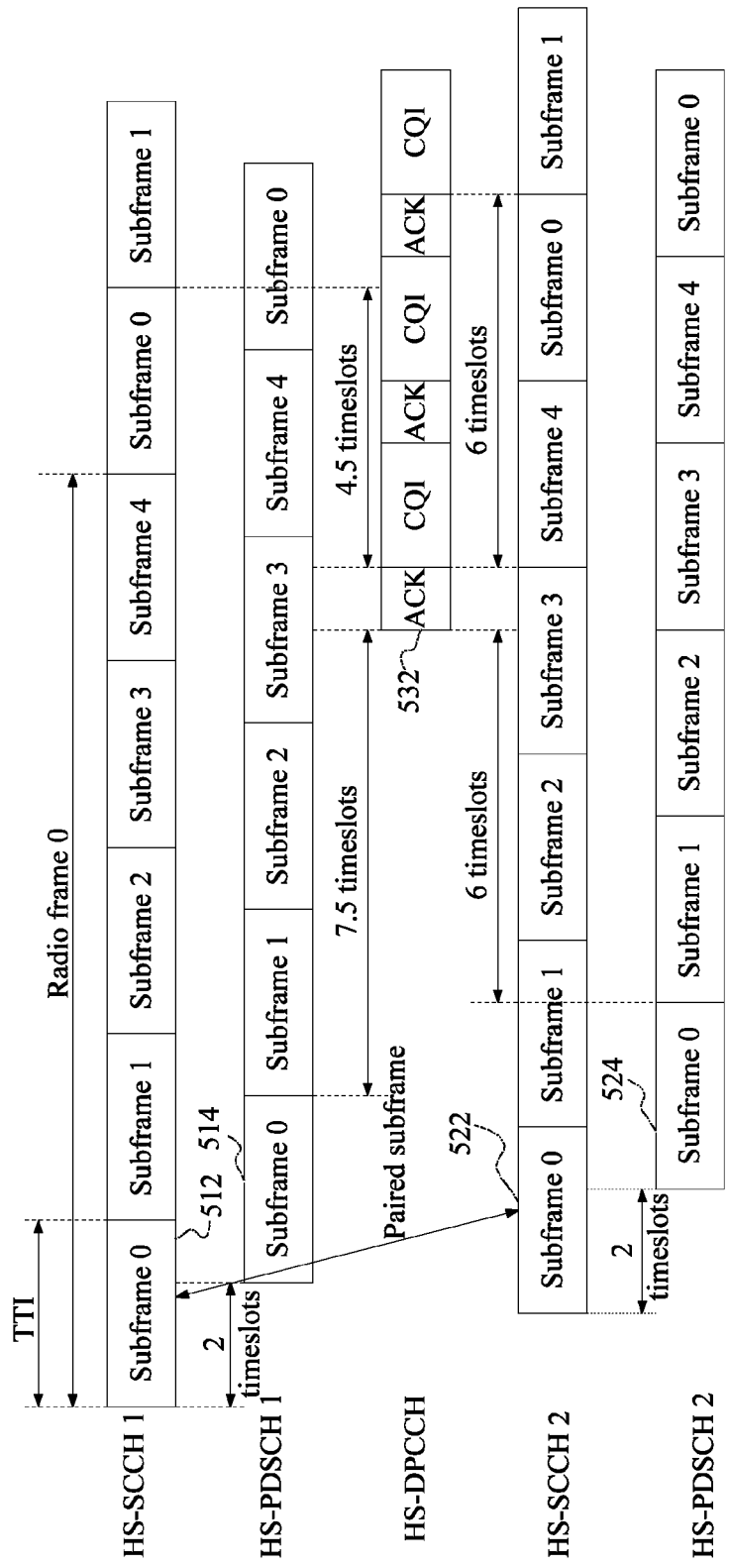
FIG. 5B is a diagram of a related timing relationship during implementation of a timing method according to Embodiment 3 of the present invention during implementation.

It may be known with reference to FIG. 5B that the UE first receives the first subframe 512 in the HS-SCCH1 channel in the timing reference cell and then receives, two timeslots later, the first subframe 514 in the HS-PDSCH1 channel in the timing reference cell. At this moment, the UE may perform demodulation, decoding, and other operations, according to the control signal carried by the first subframe 512 in the HS-SCCH1 channel, for the first subframe 514 in the HS-PDSCH1 channel. The UE may further receive, 1.5 timeslots later, the first subframe 522 in the HS-SCCH2 channel in the paired cell and then receive, two timeslots later, the first subframe 524 in the HS-PDSCH2 channel in the timing reference cell. At this moment, the UE may perform demodulation, decoding, and other operations, according to the control signal carried by the first subframe 522 in the HS-SCCH2 channel, for the first subframe 524 in the HS-PDSCH 2. After receiving and processing the subframes are completed, the UE needs to feed back, after receiving the first subframe 514 in the HS-PDSCH1 channel, the HARQ-ACK information after the predefined timeslot length. The HARQ-ACK information is HARQ-ACK information acquired by jointly encoding reception information of the subframe 514 in the timing reference cell and reception information of the paired subframe 524 in the paired cell, and generally occupies one timeslot length, namely, 532 shown in FIG. 5B. That is to say, to enable the two cells to correctly receive the feedback information, the UE has a segment of time to demodulate and decode, after receiving the subframe 514 and the subframe 524 that are mutually paired, the two subframes and then feeds back, after about 7.5 timeslots negotiated, the jointly encoded HARQ-ACK information that indicates whether the two subframes are successfully received to the HS-DPCCH channel. In this process, a time $T1ue$ for the UE to process the subframe 514 of the timing reference cell is the predefined timeslot length, namely, about 7.5 timeslots, but a time $T2ue$ for the UE to process the subframe 524 of the paired cell is shortened to: predefined timeslot length−|time difference between the subframe 514 and the paired subframe 524|, namely, 6 timeslots. Whereas for a Node B side, a base station to which the timing reference cell belongs needs to perform processing, after receiving the HARQ-ACK information, for the HARQ-ACK information fed back from the UE, where the processing time $T1NodeB$ is: timeslot length occupied by a scheduling period of an HARQ process of the timing reference cell−T3−$T1ue$=4.5 timeslots, and then the timing reference cell starts sending of a next subframe. A base station to which the paired cell belongs needs to perform processing, after receiving the HARQ-ACK information, for the HARQ-ACK information fed back from the UE, where the processing time T2Node B is extended to: timeslot length occupied by a scheduling period of an HARQ process of the paired cell−T3−T2$ue$=6 timeslots, and then the paired cell starts sending of the next subframe.

T3=|timeslot difference between a subframe in an HS-PDSCH channel and a corresponding subframe in an HS-SCCH channel|+(timeslot length occupied by the subframe in the HS-PDSCH channel)+(timeslot occupied by HARQ-ACK information)=2 timeslots+3 timeslots+1 timeslot=6 timeslots.

It should be noted that a possible range of a time difference between the paired subframes of the two cells is [−1.5 timeslots, 1.5 timeslots] and is not limited to the 1.5 timeslots assumed in the embodiment. This also applies to other embodiments and details are not described again.

To sum up, by technical means of determining one of two cells with different downlink channel timings as a timing reference cell and using the timing reference cell as a benchmark to feed back HARQ-ACK information, the timing method provided by Embodiment 3 of the present invention may solve a timing problem encountered when a UE uses a same HS-DPCCH to jointly feed back two pieces of HARQ-ACK information of a serving cell and an assisting serving cell. With reference to technical means of shortening or extending processing time of the UE and a Node B to which a paired cell belongs, the UE and the Node B are both enabled to have enough time to process their own work (for example, the Node B requires a time of at least 4.5 timeslots to process its own work), and a technical effect of enabling the UE to normally use a multiflow transmission technology in the two cells with different downlink channel timings is achieved.

Embodiment 4

In this embodiment, it is assumed that: scheduling period of an HARQ process of an anterior cell is a seven-subframe duration, a scheduling period of an HARQ process of a posterior cell is a six-subframe duration, and a delay between paired subframes is 1.5 timeslots. A process of determining a timing reference cell is implemented by a management node.

Figure 6A:
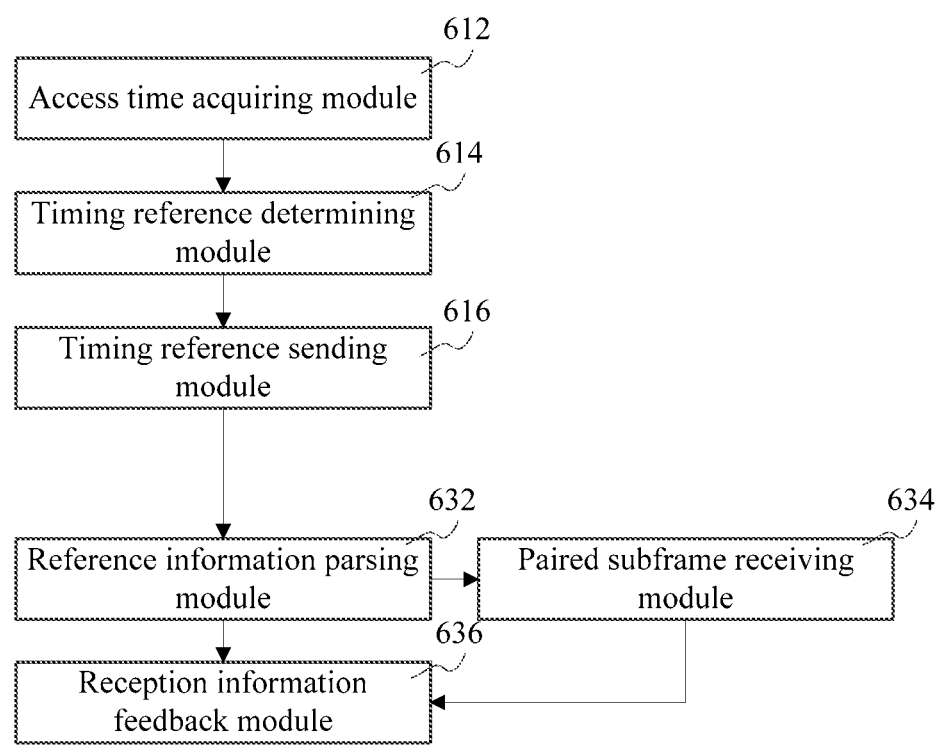
FIG. 6A is a structural block diagram of a communications system according to Embodiment 4 of the present invention.

Reference is made to FIG. 6A, which is a structural block diagram of a communications system provided by Embodiment 4 of the present invention. The communications system may be a communications system shown in FIG. 2A or FIG. 2B. The communications system may include two cells with different downlink channel timings, where the two cells both adopt high speed downlink packet access to perform downlink transmission. The communications system may specifically include a management node 610 and a mobile terminal 630.

The management node 610 is configured to send timing reference information to the mobile terminal 630. The management node 610 is generally an RNC. The management node 610 may specifically include an access time acquiring module 612, a timing reference determining module 614, and a timing reference sending module 616.

The access time acquiring module 612 is configured to acquire access time difference information reported by the mobile terminal 630.

Figure 7:
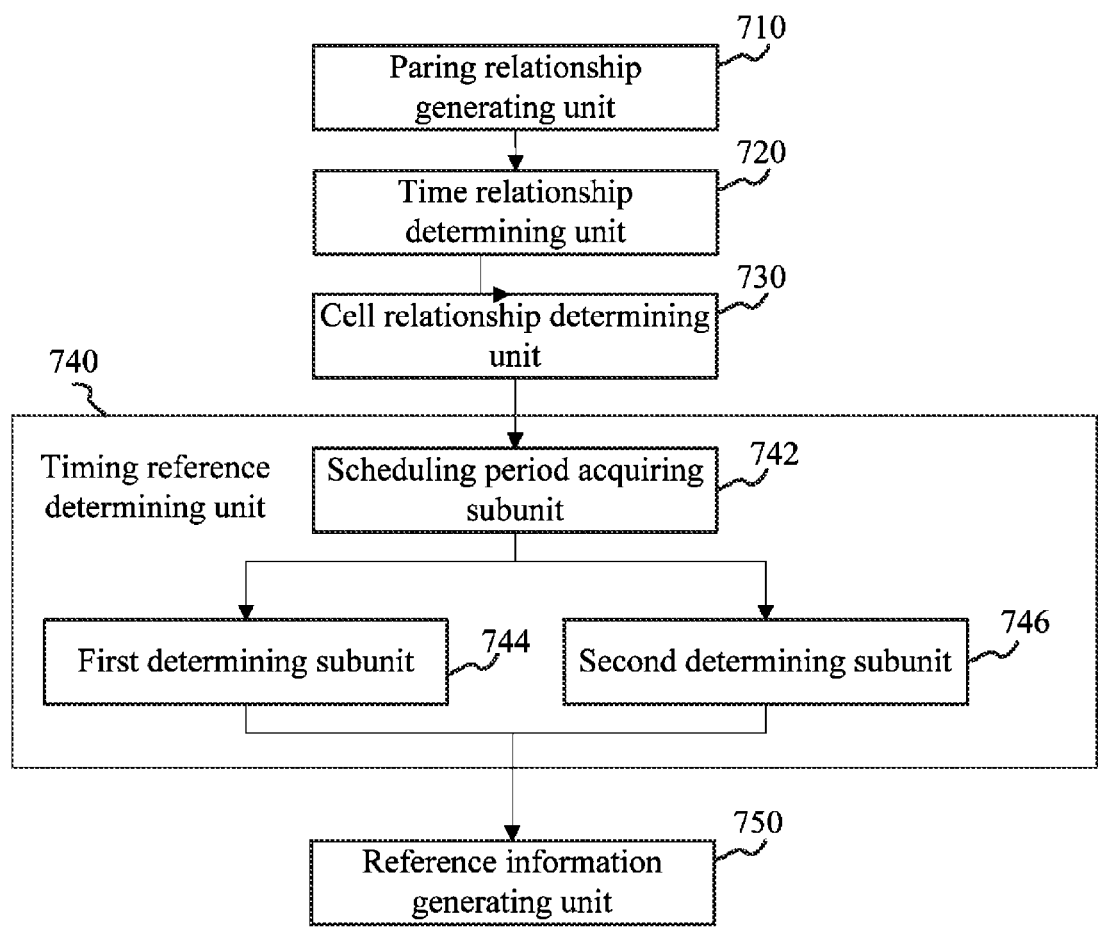
FIG. 7 is a structural block diagram of a timing reference determining module according to Embodiment 4 of the present invention.

The timing reference determining module 614 is configured to generate timing reference information according to the access time difference information, where the timing reference information includes identifier information of the timing reference cell. The timing reference determining module 614 may include a pairing relation generating unit 710, a time relationship determining unit 720, a cell relationship determining unit 730, a timing reference determining unit 740, and a reference information generating unit 750, as shown in FIG. 7. The pairing relationship generating unit 710 is configured to generate, according to the access time difference information acquired by the access time acquiring module 612, a subframe pairing relationship of the two cells. The time relationship determining unit 720 determines, according to the access time difference information and the subframe pairing relationship, a time sequence relationship of two mutually paired subframes in the two cells. The cell relationship determining unit 730 determines, according to the time sequence relationship of the two mutually paired subframes in the two cells, an anterior cell and a posterior cell in the two cells. The timing reference determining unit 740 is configured to determine, according to a scheduling period of a hybrid automatic repeat request process of the anterior cell, one of the anterior cell and the posterior cell as the timing reference cell and the other as a paired cell. The reference information generating unit 750 is configured to generate the timing reference information according to the identifier information of the timing reference cell.

Specifically speaking, the timing reference determining unit 740 may include a scheduling period acquiring subunit 742, a first determining subunit 744, and a second determining subunit 746. The scheduling period acquiring subunit 742 is configured to acquire the scheduling period of the hybrid automatic repeat request process of the anterior cell, where the scheduling period is one of a six-subframe duration, a seven-subframe duration, and an eight-subframe duration. The first determining subunit 744 is configured to determine, if the scheduling period of the hybrid automatic repeat request process of the anterior cell is the six-subframe duration, the anterior cell as the timing reference cell and the posterior cell as the paired cell. The second determining subunit 746 is configured to determine, if the scheduling period of the hybrid automatic repeat request process of the anterior cell is the seven-subframe duration or the eight-subframe duration, the posterior cell as the timing reference cell and the anterior cell as the paired cell. In a specific implementation environment shown in FIG. 6B, because the scheduling period acquiring subunit 742 acquires that the scheduling period of the HARQ process of the anterior cell is the seven-subframe duration and that the scheduling period of the HARQ process of the posterior cell is the six-subframe duration, the second determining subunit 746 may determine the posterior cell as the timing reference cell and the anterior cell as the paired cell.

The timing reference sending module 616 is configured to send the timing reference information to the mobile terminal.

The mobile terminal 630 may include a reference information parsing module 632, a paired subframe receiving module 634, and a reception information feedback module 636.

The reference information parsing module 632 is configured to learn, according to the timing reference information, that one of the two cells is the timing reference cell. In the specific implementation environment shown in FIG. 6B, the reference information parsing module 632 may learn that a cell to which an HS-SCCH1 channel belongs is the timing reference cell and that a cell to which an HS-SCCH2 channel belongs is the paired cell.

The paired subframe receiving module 634 is configured to receive the paired subframes of the two cells. The paired subframe receiving module 634 first receives a first subframe 612 in the HS-SCCH1 channel in the timing reference cell and then receives, two timeslots later, a first subframe 614 in an HS-PDSCH1 channel in the timing reference cell. At this moment, the paired subframe receiving module 634 may perform demodulation, decoding, and other operations, according to a control signal carried by the first subframe 612 in the HS-SCCH1 channel, for the first subframe 614 in the HS-PDSCH 1. The paired subframe receiving module 634 further receives a first subframe 622 in the HS-SCCH2 channel in the paired cell and then receives, two timeslots later, a first subframe 624 in an HS-PDSCH2 channel in the timing reference cell. At this moment, the paired subframe receiving module 634 may perform demodulation, decoding, and other operations, according to a control signal carried by the first subframe 622 in the HS-SCCH2 channel, for the first subframe 624 in the HS-PDSCH2 channel. Specifically speaking, the management node may further include a pairing relationship sending module (not shown in the figure), and the pairing relationship sending module is configured to send the subframe pairing relationship of the two cells to the mobile terminal 630. Correspondingly, the mobile terminal may include a pairing relationship receiving module (not shown in the figure), and the pairing relationship receiving module is configured to receive a subframe pairing relationship sent by the pairing relationship sending module. The paired subframe receiving module 634 may receive, according to the subframe pairing relationship of the two cells that is sent by the pairing relationship sending module, the paired subframes of the two cells.

The reception information feedback module 636 is configured to feed back, after a subframe in the timing reference cell is received, hybrid automatic repeat request acknowledgement information after a predefined timeslot length, where the hybrid automatic repeat request acknowledgement information is hybrid automatic repeat request acknowledgement information jointly fed back for the paired subframes in the two cells at the same time. The predefined timeslot length may be a default value or may be a value learned according to feedback time indication information sent by the management node. In the embodiment in which the management node sends the feedback time indication information, the management node may further preferably include an indication information sending module (not specifically shown). The indication information sending module is configured to send the feedback time indication information to the mobile terminal, where the feedback time indication information is used to indicate the predefined timeslot length. A value range of the predefined timeslot length is [7.5 timeslots−1.5 timeslots, 7.5 timeslots+1.5 timeslots].

Figure 6B:
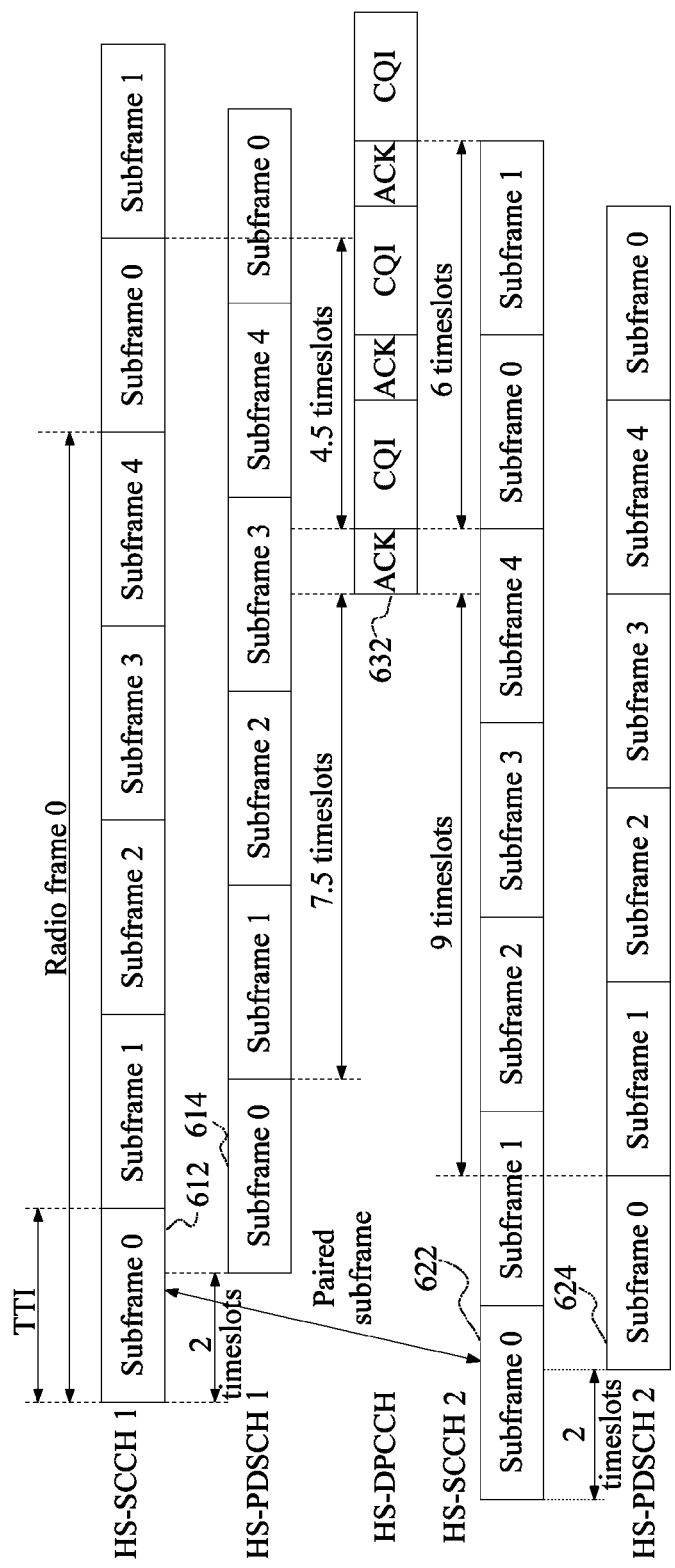
FIG. 6B is a diagram of a related timing relationship during implementation of a communications system according to Embodiment 4 of the present invention during implementation.

With reference to FIG. 6B, the reception information feedback module 636 should feed back, after the first subframe 614 in the HS-PDSCH1 channel is received, the HARQ-ACK information after a time of the predefined timeslot length. The predefined timeslot length is about 7.5 timeslots±1.5 timeslots. The HARQ-ACK information is HARQ-ACK information acquired by jointly encoding reception information of the subframe 614 in the timing reference cell and reception information of the paired subframe 624 in the paired cell, and generally occupies one timeslot, namely, 632 shown in FIG. 6B. That is to say, to enable the two cells to correctly receive the feedback information, the paired subframe receiving module 634 has some time to demodulate and decode, after receiving the subframe 614 and the subframe 624 that are mutually paired, the two subframes and then the reception information feedback module 636 must feed back, after the predefined timeslot length (7.5 timeslots) negotiated, the jointly encoded HARQ-ACK information that indicates whether the two subframes are successfully received to the HS-DPCCH channel. In this process, the time $T1ue$ required for the paired subframe receiving module 634 to process the subframe 614 of the timing reference cell is the predefined timeslot length, namely, about 7.5 timeslots, but the time $T2ue$ required for the paired subframe receiving module 634 to process the subframe 624 of the paired cell is extended to: predefined timeslot length+|time difference between the subframe 614 and the paired subframe 624|, namely, 9 timeslots. For a Node B side, a base station to which the timing reference cell belongs needs to perform processing, after receiving the HARQ-ACK information, for the HARQ-ACK information fed back from the reception information feedback module 636, where the processing time T1Node B is: timeslot length occupied by a scheduling period of an HARQ process of the timing reference cell−$T3$−$T1ue$=4.5 timeslots, and then the timing reference cell starts sending of a next subframe. A base station to which the paired cell belongs needs to perform processing, after receiving the HARQ-ACK information, for the HARQ-ACK information fed back from the reception information feedback module 636, where the processing time T2Node B is shortened to: timeslot length occupied by a scheduling period of an HARQ process of the paired cell−$T3$−$T2ue$=6 timeslots, and then the paired cell starts sending of a next subframe.

$T3$=|timeslot difference between a subframe in an HS-PDSCH channel and a corresponding subframe in an HS-SCCH channel|+(timeslot length occupied by the subframe in the HS-PDSCH channel)+(timeslot occupied by HARQ-ACK information)=2 timeslots+3 timeslots+1 timeslot=6 timeslots.

To sum up, by technical means of determining one of two cells with different downlink channel timings as a timing reference cell and using the timing reference cell as a benchmark to feed back HARQ-ACK information, the communications system provided by Embodiment 4 of the present invention solves a timing problem encountered when a UE uses a same HS-DPCCH to jointly feed back two pieces of HARQ-ACK information about a serving cell and an assisting serving cell. With reference to technical means of shortening or extending processing time of the UE and a Node B to which a paired cell belongs, the UE and the Node B are both enabled to have enough time to process their own work (for example, the Node B requires a time of at least 4.5 timeslots to process its own work), and a technical effect of enabling the UE to normally use a multiflow transmission technology in the two cells with different downlink channel timings is achieved.

It should be additionally noted that specific content of the subframe pairing relationship received by the UE may be in two forms:

Form 1: system frame numbers and subframe numbers of the two mutually paired subframes in the two cells. For example, if the two mutually paired subframes in the HS-SCCH channel are the subframe 612 and the subframe 622, the subframe pairing relationship may include: a system frame number and a subframe number of the subframe 612, and a system frame number and a subframe number of the subframe 622.

Form 2: in a first subframe and a second subframe that are mutually paired in the two cells, a system frame number and a subframe number of the first subframe, and a system frame number offset and a subframe number offset with the second subframe compared with the first subframe. For example, if the two mutually paired subframes in the HS-SCCH channel are the first subframe 612 and the second subframe 622, the subframe pairing relationship may include: a system frame number and a subframe number of the first subframe 612, an offset between a system frame number of the second subframe 622 and the system frame number of the first subframe 612, and an offset between a subframe number of the second subframe 622 and the subframe number of the first subframe 612. However, it should be noted that the first subframe is generally a subframe of the timing reference cell in the HS-SCCH channel or a subframe of a primary serving cell in the HS-SCCH channel.

It should be noted that only division of the foregoing functional modules is used as an example in the description of the communications system provided by the foregoing Embodiment 4. In a practical application, the foregoing functions may be implemented by different functional modules as required, that is, an internal structure of the apparatus is divided into different functional modules to complete all or a part of the described functions. In addition, the communications system provided by the foregoing embodiment and the method embodiment shown in Embodiment 3 are based on a same idea. For a specific implementation process of the communications system, reference may be made to the method embodiment. Details are not further described herein Embodiment 5

It is assumed that a scheduling period of an HARQ process of an anterior cell and a scheduling period of an HARQ process of a posterior cell both are a seven-subframe duration, and that a delay between paired subframes is 1.5 timeslots. A process of determining a timing reference cell is implemented by a mobile terminal.

Figure 8A:
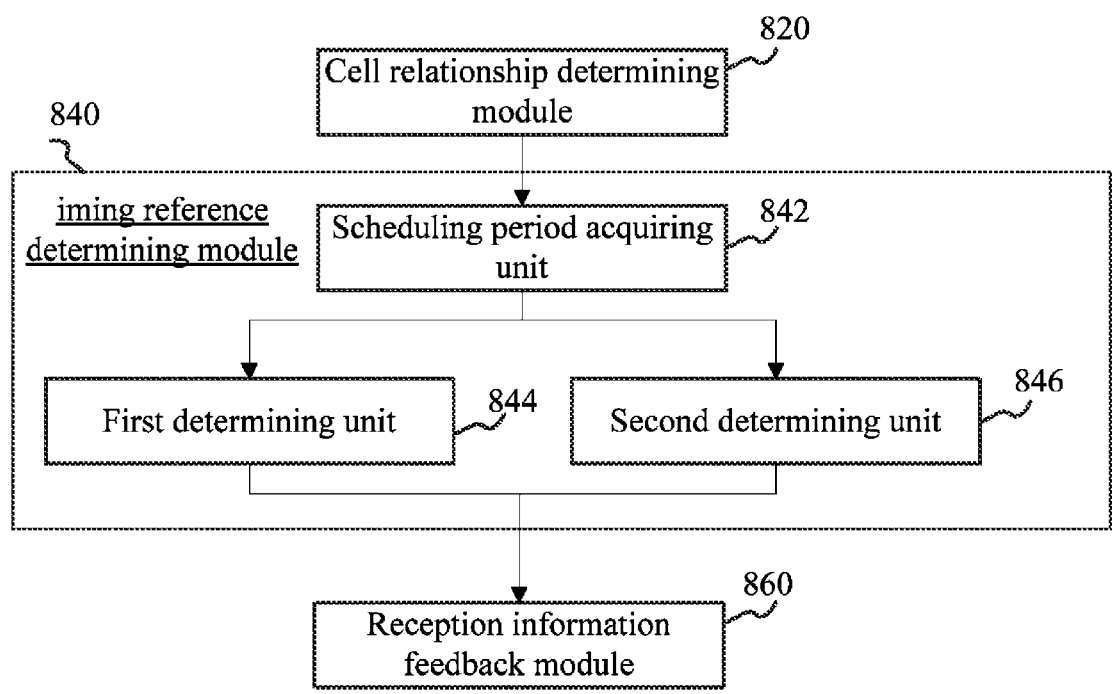
FIG. 8A is a structural block diagram of a mobile terminal according to Embodiment 5 of the present invention.

Reference is made to FIG. 8A, which is a structural block diagram of a mobile terminal provided by Embodiment 5 of the present invention. The mobile terminal may be used in a communications system shown in FIG. 2A or FIG. 2B. The communications system may include two cells with different downlink channel timings, where the two cells both adopt high speed downlink packet access to perform downlink transmission. The mobile terminal may include a cell relationship determining module 820, a timing reference determining module 840, and a reception information feedback module 860.

Figure 8B:
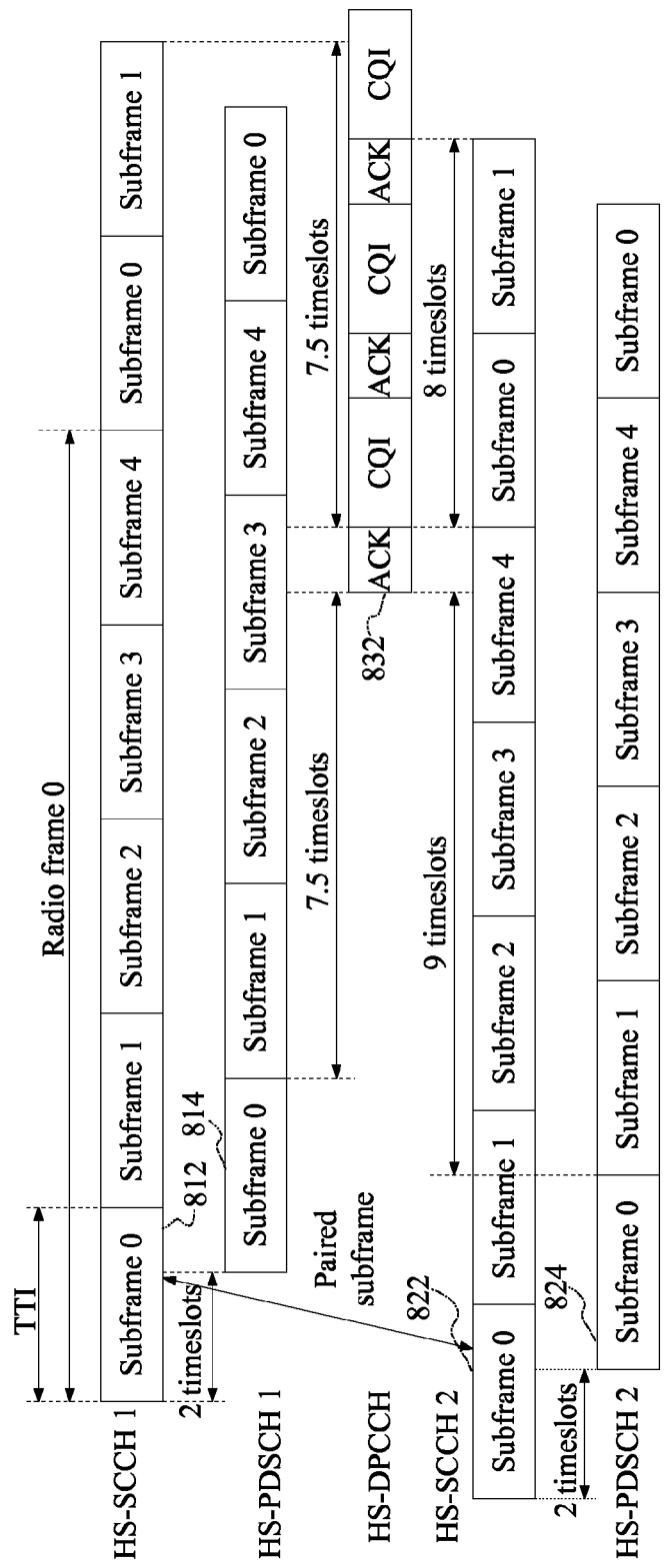
FIG. 8B is a diagram of a related timing relationship during implementation of a mobile terminal according to Embodiment 5 of the present invention during implementation.

The cell relationship determining module 820 is configured to determine, according to a time sequence relationship of two mutually paired subframes in the two cells, an anterior cell and a posterior cell in the two cells. Reference is made to FIG. 8B, and FIG. 8B shows a timing relationship between various channels in the embodiment. It is assumed that an HS-SCCH1 channel and an HS-PDSCH1 channel belong to one cell, whereas an HS-SCCH2 channel and an HS-PDSCH2 channel belong to another cell. An HS-DPCCH channel is an uplink feedback channel carried by a serving cell in the two cells. It may be known from the foregoing description that a first subframe 812 in the HS-SCCH1 channel is used to carry a control signal for decoding a first subframe 814 in the HS-PDSCH1 channel and therefore needs to be sent two timeslots in advance. In the same way, a first subframe 822 in the HS-SCCH 2 is used to carry a control signal for decoding a first subframe 824 in the HS-PDSCH2 channel and therefore also needs to be sent two timeslots in advance. The first subframe 812 in the HS-SCCH1 channel and the first subframe 822 in the HS-SCCH2 channel are mutually paired subframes, and the first subframe 812 in the HS-SCCH1 channel is 1.5 timeslots later than the first subframe 822 in the HS-SCCH2 channel. Therefore, the cell relationship determining module 820 may determine the first subframe 812 in the HS-SCCH1 channel as a posterior subframe and the first subframe 822 in the HS-SCCH2 channel as an anterior subframe, that is, the cell to which the HS-SCCH 1 belongs is the posterior cell and the cell to which the HS-SCCH 2 belongs is the anterior cell.

Figure 9:
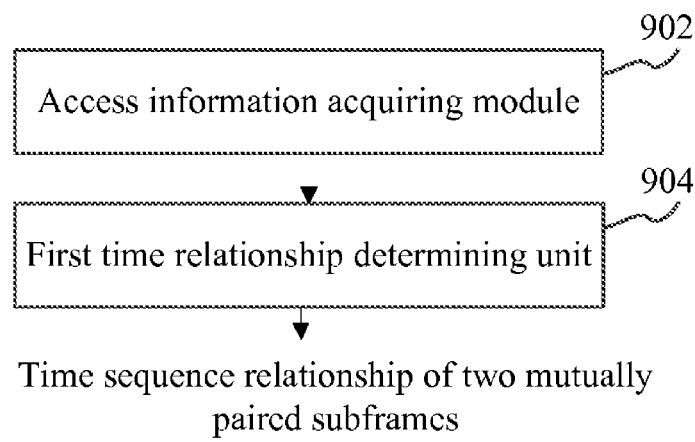
FIG. 9 is a partial structural block diagram of a mobile terminal according to Embodiment 6 of the present invention.
Figure 10:
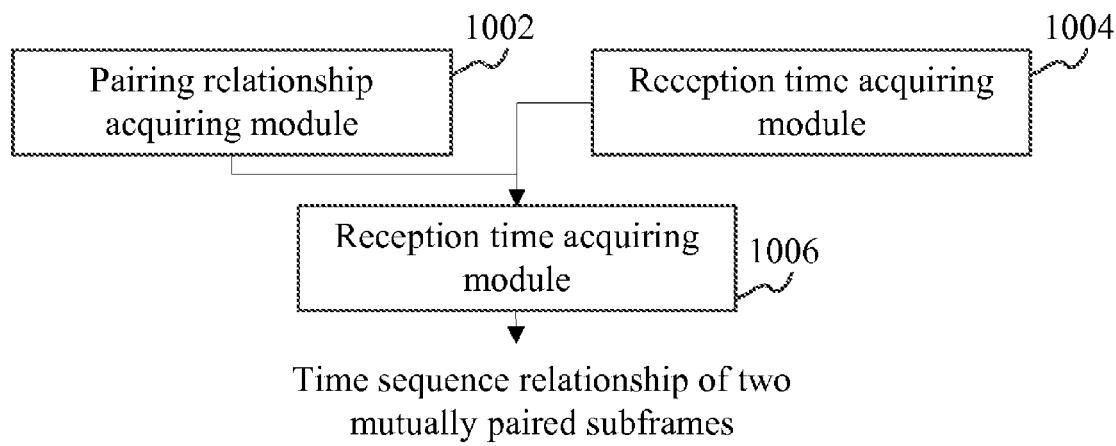
FIG. 10 is a partial structural block diagram of a mobile terminal according to Embodiment 7 of the present invention.

The timing reference determining module 840 is configured to determine, according to a scheduling period of a hybrid automatic repeat request process of the anterior cell, one of the anterior cell and the posterior cell as a timing reference cell and the other as a paired cell. The timing reference determining module 840 may specifically include a scheduling period acquiring unit 842, a first determining subunit 844, and a second determining subunit 846, as shown in FIG. 9. The scheduling period acquiring unit 842 is configured to acquire the scheduling period of the hybrid automatic repeat request process of the anterior cell, where the scheduling period is one of a six-subframe duration, a seven-subframe duration, and an eight-subframe duration. The first determining subunit 844 is configured to determine, if the scheduling period of the hybrid automatic repeat request process of the anterior cell is the six-subframe duration, the anterior cell as the timing reference cell and the posterior cell as the paired cell. The second determining subunit 846 is configured to determine, if the scheduling period of the hybrid automatic repeat request process of the anterior cell is the seven-subframe duration or the eight-subframe duration, the posterior cell as the timing reference cell and the anterior cell as the paired cell.

FIG. 8B is used as an example, if the scheduling period of the HARQ process of the anterior cell that may be acquired by the scheduling period acquiring unit 842 is the seven-subframe duration, the second determining subunit 846 may determine the posterior cell as the timing reference cell and the anterior cell as the paired cell.

The reception information feedback module 860 is configured to feed back, after a subframe in the timing reference cell is received, hybrid automatic repeat request acknowledgement information after a predefined timeslot length, where the hybrid automatic repeat request acknowledgement information is hybrid automatic repeat request acknowledgement information jointly fed back for the paired subframes in the two cells at the same time.

Specifically speaking, the UE itself may also determine the timing reference cell according to the timing reference determining method mentioned in Embodiment 2. In an actual transmission process, the UE first receives the first subframe 812 in the HS-SCCH1 channel in the timing reference cell and then receives, two timeslots later, the first subframe 814 in the HS-PDSCH1 channel in the timing reference cell. At this moment, the UE may perform demodulation, decoding, and other operations, according to the control signal carried by the first subframe 812 in the HS-SCCH1 channel, for the first subframe 814 in the HS-PDSCH1 channel. The UE may further receive the first subframe 822 in the HS-SCCH2 channel in the paired cell and then receive, two timeslots later, the first subframe 824 in the HS-PDSCH2 channel in the timing reference cell. At this moment, the UE may perform demodulation, decoding, and other operations, according to the control signal carried by the first subframe 822 in the HS-SCCH2 channel, for the first subframe 824 in the HS-PDSCH2 channel. After that, the UE should feed back, after receiving the first subframe 814 in the HS-PDSCH 1, the HARQ-ACK information after a time of the predefined timeslot length. The predefined timeslot length is about 7.5 timeslots±1.5 timeslots. The HARQ-ACK information is HARQ-ACK information acquired by jointly encoding reception information of the subframe 814 in the timing reference cell and reception information of the paired subframe 824 in the paired cell, and generally occupies one timeslot, namely, 832 shown in FIG. 8B. That is to say, to enable the two cells to correctly receive the feedback information, the UE has some time to perform demodulation and decoding, after receiving the subframe 814 and the subframe 824 that are mutually paired, for the two subframes, and then must feed back, after the predefined timeslot length (about 7.5 timeslots) negotiated, the jointly encoded HARQ-ACK information that indicates whether the two subframes are successfully received to the HS-DPCCH channel. In this process, the time T1$ue$ for the UE to process the subframe 814 of the timing reference cell is the predefined timeslot length, namely, about 7.5 timeslots, but the time T2$ue$ for the UE to process the subframe 824 of the paired cell is extended to: predefined timeslot length+|time difference between the subframe 814 and the paired subframe 824|, namely, 9 timeslots. For a Node B side, a base station to which the timing reference cell belongs needs to perform processing, after receiving the HARQ-ACK information, for the HARQ-ACK information fed back from the UE, where the processing time T1Node B is: timeslot length occupied by an HARQ process scheduling period of the timing reference cell−T3−T1$ue$=7.5 timeslots, and then the timing reference cell starts next subframe sending. A base station to which the paired cell belongs needs to perform processing, after receiving the HARQ-ACK information, for the HARQ-ACK information fed back from the UE, where the processing time T2Node B is shortened to: timeslot length occupied by a scheduling period of an HARQ process of the paired cell−T3−T2$ue$=6 timeslots, and then the paired cell starts sending of a next subframe.

T3=|timeslot difference between a subframe in an HS-PDSCH channel and a corresponding subframe in an HS-SCCH channel|+(timeslot length occupied by the subframe in the HS-PDSCH channel)+(timeslot occupied by HARQ-ACK information)=2 timeslots+3 timeslots+1 timeslot=6 timeslots.

Preferably, the mobile terminal may adopt two manners to determine the time sequence relationship of the two mutually paired subframes in the two cells. Therefore, in a specific embodiment, the mobile terminal may further include an access information acquiring module 902 and a first time relationship determining module 904, as shown in FIG. 9. The access information acquiring module 902 is configured to acquire access time difference information of two cells. The first time relationship determining module 904 is configured to determine, according to the access time difference information, a time sequence relationship of two mutually paired subframes in the two cells.

In another specific embodiment, the mobile terminal may further include a pairing relationship receiving module 1002, a reception time acquiring module 1004, and a second time relationship determining module 1006. The pairing relationship receiving module 1002 is configured to receive a subframe pairing relationship of two cells. The reception time acquiring module 1004 is configured to acquire reception time of two mutually paired subframes in the two cells. The second time relationship determining module 1006 is configured to determine, according to the subframe pairing relationship and the reception time, a time sequence relationship of the two mutually paired subframes in the two cells.

To sum up, by technical means of determining one of two cells with different downlink channel timings as a timing reference cell and using the timing reference cell as a benchmark to feed back HARQ-ACK information, the mobile terminal provided by Embodiment 5 of the present invention solves a timing problem encountered when a UE uses a same HS-DPCCH to jointly feed back two pieces of HARQ-ACK information of a serving cell and an assisting serving cell. With reference to technical means of shortening or extending processing time of the UE and a Node B to which a paired cell belongs, the UE and the Node B both are enabled to have enough time to process their own work (for example, the Node B requires a time of at least 4.5 timeslots to process its own work), and a technical effect of enabling the UE to normally use a multiflow transmission technology in the two cells with different downlink channel timings is achieved.

It should be additionally noted that, an embodiment in which the scheduling period of the HARQ process of the anterior cell is the eight-subframe duration may be easily thought of according to the foregoing embodiment and therefore is not described herein again.

A person of ordinary skill in the art may understand that all or a part of the steps of the embodiments may be implemented by hardware or a program instructing relevant hardware. The program may be stored in a computer readable storage medium. The storage medium may include: a read-only memory, a magnetic disc, or an optical disc.

The foregoing embodiments are exemplary embodiments of the present invention only and not intended to limit the present invention. All modifications, equivalent substitutions, and improvements made without departing from the spirit and principle of the present invention shall fall within the protection scope of the present invention.

What is claimed is:

1. A method for sending timing reference information used in a communications system comprising two cells with different downlink channel timings, the two cells both adopt a hybrid automatic repeat request process in high speed downlink packet access to perform downlink transmission, and the method comprising:
    acquiring access time difference information reported by a mobile terminal;
    generating a subframe pairing relationship of the two cells according to the access time difference information;
    determining, according to the access time difference information and the subframe pairing relationship, a time sequence relationship of two mutually paired subframes in the two cells;
    determining an anterior cell and a posterior cell in the two cells;
    determining, according to a scheduling period of a hybrid automatic repeat request process of the anterior cell, one of the anterior cell and the posterior cell as the timing reference cell and the other as a paired cell;
    generating timing reference information according to an identifier information of the timing reference cell, wherein the timing reference information comprises the identifier information of a timing reference cell; and
    sending the timing reference information to the mobile terminal.

2. The method for sending timing reference information according to claim 1, wherein the determining the anterior cell and the posterior cell in the two cells further comprises:
determining, according to the time sequence relationship of the two mutually paired subframes in the two cells, the anterior cell and the posterior cell in the two cells.

3. The method for sending timing reference information according to claim 1, wherein the hybrid automatic repeat request process scheduling period of the anterior cell is one of a six-subframe duration, a seven-subframe duration, and an eight-subframe duration,
wherein the determining, according to the scheduling period of the hybrid automatic repeat request process of the anterior cell, one of the anterior cell and the posterior cell as the timing reference cell and the other as the paired cell further comprises:
determining, when the scheduling period of the hybrid automatic repeat request process of the anterior cell is the six-subframe duration, the anterior cell as the timing reference cell and the posterior cell as the paired cell.

4. The method for sending timing reference information according to claim 1, wherein the scheduling period of the hybrid automatic repeat request process of the anterior cell is one of a six-subframe duration, a seven-subframe duration, and an eight-subframe duration,
wherein the determining, according to the scheduling period of the hybrid automatic repeat request process of the anterior cell, one of the anterior cell and the posterior cell as the timing reference cell and the other as the paired cell further determining, by a management node, if the scheduling period of the hybrid automatic repeat request process of the anterior cell is the seven-subframe duration or the eight-subframe duration, the posterior cell as the timing reference cell and the anterior cell as the paired cell.

5. The method for sending timing reference information according to claim 1, further comprising:
sending the subframe pairing relationship of the two cells to the mobile terminal.

6. The method for sending timing reference information according to claim 1, wherein the subframe pairing relationship comprises:
system frame numbers and subframe numbers of the two mutually paired subframes in the two cells.

7. The method for sending timing reference information according to claim 1, further comprising:
sending feedback time indication information to the mobile terminal, wherein the feedback time indication information indicates a predefined timeslot length, wherein a value range of the predefined timeslot length is 7.5 timeslots−1.5 timeslots, 7.5 timeslots+1.5 timeslots.

8. A radio network controller used in a communications system comprising two cells with different downlink channel timings, the two cells both adopt a hybrid automatic repeat request process in high speed downlink packet access to perform downlink transmission, and the radio network controller comprising:
a processor; and
a non-transitory processor-readable medium having processor-executable instructions stored thereon, which when executed causes the processor to implement operations including:
acquiring access time difference information reported by a mobile terminal;
generating a subframe pairing relationship of the two cells according to the access time difference information;
determining, according to the access time difference information and the subframe pairing relationship, a time sequence relationship of two mutually paired subframes in the two cells;
determining an anterior cell and a posterior cell in the two cells;
determining, according to a scheduling period of a hybrid automatic repeat request process of the anterior cell, one of the anterior cell and the posterior cell as the timing reference cell and the other as a paired cell;
generating timing reference information according to identifier information of the timing reference cell, wherein the timing reference information comprises the identifier information of a timing reference cell; and
sending the timing reference information to the mobile terminal.

9. The radio network controller according to claim 8, wherein the operations further include determining, according to the time sequence relationship of the two mutually paired subframes in the two cells, the anterior cell and the posterior cell in the two cells.

10. The radio network controller according to claim 8, wherein
the scheduling period of the hybrid automatic repeat request process of the anterior cell is one of a six-subframe duration, a seven-subframe duration, and an eight-subframe duration; and
wherein the operations further include determining, when the scheduling period of the hybrid automatic repeat request process of the anterior cell is the six-subframe duration, the anterior cell as the timing reference cell and the posterior cell as the paired cell.

11. The radio network controller according to claim 8, wherein
the scheduling period of the hybrid automatic repeat request process of the anterior cell is one of a six-subframe duration, a seven-subframe duration, and an eight-subframe duration; and
wherein the operations further include determining, when the scheduling period of the hybrid automatic repeat request process of the anterior cell is the seven-subframe duration or the eight-subframe duration, the posterior cell as the timing reference cell and the anterior cell as the paired cell.

12. The radio network controller according to claim 8, wherein the operations further include sending the subframe pairing relationship of the two cells to the mobile terminal.

13. The radio network controller according to claim 8, wherein the operations further include sending feedback time indication information to the mobile terminal, wherein the feedback time indication information indicates a predefined timeslot length, wherein a value range of the predefined timeslot length is 7.5 timeslots−1.5 timeslots, 7.5 timeslots+1.5 timeslots.

14. The radio network controller according to claim 8, wherein the subframe pairing relationship comprises one of the following:
(a) system frame numbers and subframe numbers of the two mutually paired subframes in the two cells; and
(b) in a first subframe and a second subframe that are mutually paired in the two cells, a system frame number and a subframe number of the first subframe, and a system frame number offset and a subframe number offset with the second subframe compared with the first subframe.

15. A mobile terminal used in a communications system comprising two cells with different downlink channel timings, the two cells both adopt a hybrid automatic repeat request process in high speed downlink packet access to perform downlink transmission, and the mobile terminal comprising:
- a processor; and
- a non-transitory processor-readable medium having processor-executable instructions stored thereon, which when executed causes the processor to implement operations including:
  - receiving timing reference information, wherein the timing reference information includes identifier information of a timing reference cell, a subframe pairing relationship of the two cells, and a time sequence relationship of two mutually paired subframes in the two cells, wherein (a) one of the two cells is the timing reference cell and the other is a paired cell and (b) the timing reference cell is selected from one of an anterior cell and a posterior cell in the two cells according to a scheduling period of a hybrid automatic repeat request process of the anterior cell;
  - recognizing, according to the timing reference information, that one of the two cells is a timing reference cell; and
  - feeding back, after a subframe in the timing reference cell is received, hybrid automatic repeat request acknowledgement information after a predefined timeslot length, wherein the hybrid automatic repeat request acknowledgement information is hybrid automatic repeat request acknowledgement information jointly fed back for the paired subframes in the two cells at the same time.

16. The mobile terminal according to claim 15, wherein the operations further include receiving and parsing feedback time indication information to acquire the predefined timeslot length, wherein a value range of the predefined timeslot length is 7.5 timeslots−1.5 timeslots, 7.5 timeslots+1.5 timeslots.

17. The method for sending timing reference information according to claim 1, wherein the subframe pairing relationship comprises:
in a first subframe and a second subframe that are mutually paired in the two cells, a system frame number and a subframe number of the first subframe, and a system frame number offset and a subframe number offset with the second subframe compared with the first subframe.

18. The mobile terminal according to claim 15, wherein the subframe pairing relationship comprises, in first and second subframes that are mutually paired in the two cells, a system frame number and a subframe number of the first subframe, and a system frame number offset and a subframe number offset with the second subframe compared with the first subframe.

* * * * *